US006967186B2

(12) United States Patent
Takaya et al.

(10) Patent No.: US 6,967,186 B2
(45) Date of Patent: Nov. 22, 2005

(54) EXHAUST GAS PURIFYING CATALYST

(75) Inventors: Masahiro Takaya, Kanagawa-ken (JP); Shinji Yamamoto, Kanagawa-ken (JP); Yoshiaki Hiramoto, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 314 days.

(21) Appl. No.: 10/285,456

(22) Filed: Nov. 1, 2002

(65) Prior Publication Data

US 2003/0083193 A1 May 1, 2003

(30) Foreign Application Priority Data

Nov. 1, 2001 (JP) ....................................... 2001-336188
Nov. 1, 2001 (JP) ....................................... 2001-336227
Oct. 8, 2002 (JP) ....................................... 2002-294435

(51) Int. Cl.[7] ........................... B01J 23/00; B01J 23/40; B01J 23/42; B01J 23/56; B01J 23/44

(52) U.S. Cl. ....................... 502/325; 502/302; 502/303; 502/304; 502/326; 502/327; 502/332; 502/333; 502/334; 502/339; 502/349; 502/355; 502/415; 502/439; 502/527.18; 502/527.19; 502/527.12; 502/527.13

(58) Field of Search ................................ 502/302–304, 502/325–327, 332–334, 339, 349, 355, 415, 439, 527.18, 527.19, 527.12, 527.13

(56) References Cited

U.S. PATENT DOCUMENTS

| | | | | | |
|---|---|---|---|---|---|
| 4,499,205 | A | * | 2/1985 | Masuda | 502/303 |
| 4,528,279 | A | * | 7/1985 | Suzuki et al. | 502/200 |
| 4,587,231 | A | * | 5/1986 | Sawamura et al. | 502/304 |

(Continued)

FOREIGN PATENT DOCUMENTS

| | | | |
|---|---|---|---|
| EP | 0 918 145 | A2 | 5/1999 |
| EP | 0 948 987 | A1 | 10/1999 |
| EP | 1 068 892 | A2 | 1/2001 |
| EP | 1 121 981 | A2 | 8/2001 |
| EP | 1 270 887 | A2 | 1/2003 |
| JP | 2-056247 | A | 2/1990 |
| JP | 5-059942 | A | 3/1993 |
| JP | 6-074019 | A | 3/1994 |
| JP | 6-142457 | A | 5/1994 |
| JP | 7-096183 | A | 4/1995 |
| JP | 7-102957 | A | 4/1995 |
| JP | 7-144119 | A | 6/1995 |
| JP | 9-057102 | A | 3/1997 |
| JP | 9-085056 | A | 3/1997 |
| JP | 11-210451 | A | 8/1999 |

OTHER PUBLICATIONS

S. Yamamoto et al., "In–line Hydrocarbon (HC) Adsorber System for Reducing Cold–Start Emissions", SAE Technical Paper Series, 2001–01–0892, SAE 2000 World Congress, Mar. 6–9, 2000, pp. 1–9.

*Primary Examiner*—Cam N. Nguyen

(74) *Attorney, Agent, or Firm*—Foley & Lardner LLP

(57) ABSTRACT

An exhaust gas purifying catalyst including a carrier having a plurality of cells as exhaust gas passages, an HC adsorbent layer formed on the carrier of each of the cells, and an upper catalyst layer disposed on an upstream side of each of the exhaust gas passages on the HC adsorbent layer and a lower catalyst layer disposed on a downstream side of each of the exhaust gas passages on the HC adsorbent layer. The upper catalyst layer includes more O2-storage material than the lower catalyst layer, and the lower catalyst layer includes a catalyst having a wider activation range than the upper catalyst layer.

20 Claims, 20 Drawing Sheets

U.S. PATENT DOCUMENTS

| | | | | | |
|---|---|---|---|---|---|
| 4,868,149 | A | * | 9/1989 | Bricker | 502/303 |
| 4,960,574 | A | * | 10/1990 | Bricker | 423/213.5 |
| 5,179,059 | A | * | 1/1993 | Domesle et al. | 502/303 |
| 5,315,824 | A | | 5/1994 | Takeshima | |
| 5,407,880 | A | * | 4/1995 | Ikeda et al. | 502/67 |
| 5,672,557 | A | * | 9/1997 | Williamson et al. | 502/303 |
| 5,681,788 | A | * | 10/1997 | Kanesaka et al. | 502/65 |
| 5,741,467 | A | * | 4/1998 | Williamson et al. | 423/213.5 |
| 5,849,660 | A | * | 12/1998 | Takemoto et al. | 502/327 |
| 6,047,544 | A | | 4/2000 | Yamamoto et al. | |
| 6,150,288 | A | * | 11/2000 | Suzuki et al. | 501/105 |
| 6,306,794 | B1 | * | 10/2001 | Suzuki et al. | 502/304 |
| 6,387,338 | B1 | * | 5/2002 | Anatoly et al. | 423/239.1 |
| 6,444,610 | B1 | * | 9/2002 | Yamamoto | 502/325 |
| 6,458,741 | B1 | * | 10/2002 | Roark et al. | 502/303 |
| 6,503,862 | B1 | * | 1/2003 | Yamamoto | 502/65 |
| 6,514,905 | B1 | * | 2/2003 | Hanaki et al. | 502/328 |
| 6,569,392 | B1 | * | 5/2003 | Li et al. | 423/213.5 |
| 6,589,901 | B2 | * | 7/2003 | Yamamoto et al. | 502/65 |

* cited by examiner

EXAMPLE I-1, I-3~I-6
A-A'

EXAMPLE I-1, I-3~I-6
B-B'

EXAMPLE I-1, I-3~I-6

EXAMPLE Ⅰ-2, Ⅰ-7～Ⅰ-11

COMPARATIVE EXAMPLE Ⅰ-1

FIG.6A

Table I-1

| | Materials in upper catalyst layer | Element of [A] of Ce-[A]-Ob (Ce0.69[A]Ob) | Materials in lower catalyst layer | Structure of HC-trap catalyst |
|---|---|---|---|---|
| Example I-1 | Pd/Ce-[A]-Ob | La0.01Zr0.3 | Pd/Ce-Al2O3 | Fig.2A～2C |
| Example I-2 | Pd/Ce-[A]-Ob<br>+Pd/Ce-Al2O3 | La0.01Zr0.3 | Pt/Ce-Al2O3<br>Rh/Zr-Al2O3<br>Pt/LaCe-ZrO2 | Fig.3 |
| Example I-3 | Pd/Ce-[A]-Ob | La0.01Pr0.3 | Pd/Ce-Al2O3 | Fig.2A～2C |
| Example I-4 | Pd/Ce-[A]-Ob | La0.01Nd0.3 | Pd/Ce-Al2O3 | Fig.2A～2C |
| Example I-5 | Pd/Ce-[A]-Ob | La0.01Pr0.2Nd0.1 | Pd/Ce-Al2O3 | Fig.2A～2C |
| Example I-6 | Pd/Ce-[A]-Ob | La0.01Zr0.2Pr0.1 | Pd/Ce-Al2O3 | Fig.2A～2C |
| Example I-7 | Pd/Ce-[A]-Ob<br>+Pd/Ce-Al2O3 | La0.01Pr0.3 | Pt/Ce-Al2O3<br>Rh/Zr-Al2O3<br>Pt/LaCe-ZrO2 | Fig.3 |
| Example I-8 | Pd/Ce-[A]-Ob<br>+Pd/Ce-Al2O3 | La0.01Nd0.3 | Pt/Ce-Al2O3<br>Rh/Zr-Al2O3<br>Pt/LaCe-ZrO2 | Fig.3 |
| Example I-9 | Pd/Ce-[A]-Ob<br>+Pd/Ce-Al2O3 | La0.01Pr0.2Nd0.1 | Pt/Ce-Al2O3<br>Rh/Zr-Al2O3<br>Pt/LaCe-ZrO2 | Fig.3 |
| Example I-10 | Pd/Ce-[A]-Ob<br>+Pd/Ce-Al2O3 | La0.01Y0.3 | Pt/Ce-Al2O3<br>Rh/Zr-Al2O3<br>Pt/LaCe-ZrO2 | Fig.3 |
| Example I-11 | Pd/Ce-[A]-Ob<br>+Pd/Ce-Al2O3 | La0.01Zr0.2Y0.1 | Pt/Ce-Al2O3<br>Rh/Zr-Al2O3<br>Pt/LaCe-ZrO2 | Fig.3 |

FIG.6B

Table I-2

| | Materials in upper catalyst layer | Element of [A] of Ce-[A]-Ob ($Ce_{0.69}$[A]Ob) | Materials in lower catalyst layer | Structure of HC-trap catalyst |
|---|---|---|---|---|
| Comparative example I-1 | Pd/Ce-[A]-Ob +Pd/Ce-$Al_2O_3$ | $La_{0.01}Zr_{0.3}$ | Pd/Ce-[A]-Ob +Pd/Ce-$Al_2O_3$ | Fig.4 Both of upper and lower catalyst layers contains same composition |
| Comparative example I-2 | Pd/Ce-[A]-Ob +Pd/Ce-$Al_2O_3$ | $La_{0.01}Zr_{0.3}$ | Pd/Ce-$Al_2O_3$ | Upper catalyst layer covers 90% area of HC absorbent layer |
| Comparative example I-3 | Pd/Ce-$Al_2O_3$ | — | Pd/Ce-$Al_2O_3$ | Ce- [A]-Ob is not contained in upper catalyst layer |
| Comparative example I-4 | Pd/Ce-[A]-Ob | $La_{0.01}Zr_{0.3}$ | Pd/Ce-$Al_2O_3$ | Upper and lower layers are provided on separate carriers |
| Comparative example I-5 | Pd/Ce-$Al_2O_3$ | $La_{0.01}Zr_{0.3}$ | Pd/Ce-[A]-Ob | Arrangement of the Example 1 is put in reverse order |

FIG.6C

Table I-3

| | Upper and lower catalyst layer | | | | HC absorption rate (%) | HC puritication rate (%) |
|---|---|---|---|---|---|---|
| | Pt (g/L) | Pd (g/L) | Rh (g/L) | BaO (g/L) | | |
| Example I-1 | — | 2.83 | — | 1.70 | 80 | 42 |
| Example I-2 | 0.71 | 1.88 | 0.24 | 3.30 | 79 | 46 |
| Example I-3 | — | 1.88 | 0.24 | 3.30 | 80 | 45 |
| Example I-4 | — | 1.88 | 0.24 | 3.30 | 81 | 46 |
| Example I-5 | — | 1.88 | 0.24 | 3.30 | 80 | 47 |
| Example I-6 | — | 1.88 | 0.24 | 3.30 | 80 | 47 |
| Example I-7 | 0.71 | 1.88 | 0.24 | 3.30 | 80 | 48 |
| Example I-8 | 0.71 | 1.88 | 0.24 | 3.30 | 80 | 47 |
| Example I-9 | 0.71 | 1.88 | 0.24 | 3.30 | 79 | 48 |
| Example I-10 | 0.71 | 1.88 | 0.24 | 3.30 | 80 | 47 |
| Example I-11 | 0.71 | 1.88 | 0.24 | 3.30 | 80 | 48 |
| Comparative example I-1 | — | 2.83 | — | 2.70 | 80 | 36 |
| Comparative example I-2 | — | 2.83 | — | 1.70 | 80 | 29 |
| Comparative example I-3 | — | 2.83 | | 1.70 | 79 | 18 |
| Comparative example I-4 | — | 1.88 | — | 3.30 | 80 | 20 |
| Comparative example I-5 | 0.71 | — | 0.24 | — | 79 | 13 |

EXAMPLE Ⅱ-1, Ⅱ-10
A-A'

EXAMPLE Ⅱ-1, Ⅱ-10
B-B'

EXAMPLE Ⅱ-1, Ⅱ-10

EXAMPLE II-2

EXAMPLE II-3

EXAMPLE II-4

EXAMPLE II-5

EXAMPLE II-6

EXAMPLE II-7, II-11

EXAMPLE II-8

EXAMPLE Ⅱ-9

COMPARATIVE EXAMPLE Ⅱ-1

COMPARATIVE EXAMPLE II-2

COMPARATIVE EXAMPLE II-3

COMPARATIVE EXAMPLE II-4

COMPARATIVE EXAMPLE II-5

COMPARATIVE EXAMPLE 6

FIG.22A

Table Ⅱ-1

| | Materials in upper catalyst layer | | Element of [A] of Ce-[A]-Ob (Ce0.69[A]Ob) | Materials in lower catalyst layer | | Structure of HC-trap catalyst |
|---|---|---|---|---|---|---|
| | 1st layer | 2nd layer | | 1st layer | 2nd layer | |
| Example Ⅱ-1 | HC-absorbent (zeolite) layer | Pd/Ce-[A]-Ob | La0.01Zr0.3 | Thick HC-absorbent (zeolite) layer | Pd/Ce-Al2O3 | Fig.7A～7C |
| Example Ⅱ-2 | HC-absorbent (zeolite) layer | Pd/Ce-[A]-Ob | La0.01Pr0.3 | Thick Al2O3 layer | Pd/Ce-Al2O3 | Fig.8 |
| Example Ⅱ-3 | HC-absorbent (zeolite) layer | Pd/Ce-[A]-Ob<br>Pd/Ce-Al2O3 | La0.01Nd0.3 | Thick Al2O3 layer | Pd/Ce-Al2O3 | Fig.9 |
| Example Ⅱ-4 | HC-absorbent (zeolite) layer | Pd/Ce-[A]-Ob | La0.01Pr0.2Nd0.1 | Thick Al2O3 layer | Pt/Ce-Al2O3<br>Rh/Zr-Al2O3<br>Pt/LaCe-ZrO2 | Fig.10 |
| Example Ⅱ-5 | HC-absorbent (zeolite) layer | Pd/Ce-[A]-Ob<br>Pd/Ce-Al2O3 | La0.01Zr0.2Pr0.1 | Thick Al2O3 layer | Pt/Ce-Al2O3<br>Rh/Zr-Al2O3<br>Pt/LaCe-ZrO2 | Fig.11 |

FIG.22B

Table Ⅱ-2

| | Materials in upper catalyst layer | | Element of [A] of Ce-[A]-Ob (Ce0.69[A]Ob) | Materials in lower catalyst layer | | Structure of HC-trap catalyst |
|---|---|---|---|---|---|---|
| | 1st layer | | | 1st layer | 2nd layer | |
| Example Ⅱ-6 | HC-absorbent (zeolite) layer | Pd/Ce-[A]-Ob | La0.01Pr0.3 | — | Pd/Ce-Al2O3 | Fig.12 |
| Example Ⅱ-7 | HC-absorbent (zeolite) layer | Pd/Ce-[A]-Ob<br>Pd/Ce-Al2O3 | La0.01Nd0.3 | — | Pd/Ce-Al2O3 | Fig.13 |
| Example Ⅱ-8 | HC-absorbent (zeolite) layer | Pd/Ce-[A]-Ob | La0.01Pr0.2Nd0.1 | — | Pt/Ce-Al2O3<br>Rh/Zr-Al2O3<br>Pt/LaCe-ZrO2 | Fig.14 |
| Example Ⅱ-9 | HC-absorbent (zeolite) layer | Pd/Ce-[A]-Ob<br>Pd/Ce-Al2O3 | La0.01Zr0.2Pr0.1 | — | Pt/Ce-Al2O3<br>Rh/Zr-Al2O3<br>Pt/LaCe-ZrO2 | Fig.15 |
| Example Ⅱ-10 | HC-absorbent (zeolite) layer | Pd/Ce-[A]-Ob | La0.01Y0.3 | Thick HC-absorbent (zeolite) layer | Pd/Ce-Al2O3 | Fig.7A～7C |
| Example Ⅱ-11 | HC-absorbent (zeolite) layer | Pd/Ce-[A]-Ob<br>Pd/Ce-Al2O3 | La0.01Zr0.2Y0.1 | — | Pd/Ce-Al2O3 | Fig.13 |

FIG.22C

Table II-3

| | Materials in upper catalyst layer | | Element of [A] of Ce-[A]-Ob (La0.01Ce0.69[A]0.3Ob) | Component of lower catalyst | Materials in lower catalyst layer | Structure of HC-trap catalyst |
|---|---|---|---|---|---|---|
| | 1st layer | 2nd layer | | 1st layer | 2nd layer | |
| Comparative example II-1 | Thuck HC-absorbent (zeolite) layer | Pd/Ce-Al2O3 | La0.01Zr0.3 | HC-absorbent (zeolite) layer | Pd/Ce-[A]-Ob | Fig.16 |
| Comparative example II-2 | HC-absorbent (zeolite) layer | Pd/Ce-[A]-Ob | La0.01Zr0.3 | HC-absorbent (zeolite) layer | Pd/Ce-Al2O3 | Fig.17 |
| Comparative example II-3 | Thuck Al2O3 layer | Pd/Ce-Al2O3 | La0.01Zr0.3 | HC-absorbent (zeolite) layer | Pd/Ce-[A]-Ob | Fig.18 |
| Comparative example II-4 | HC-absorbent (zeolite) layer | Pd/Ce-[A]-Ob | La0.01Zr0.3 | — | Pt/Ce-Al2O3 | Fig.19 |
| Comparative example II-5 | — | Pd/Ce-Al2O3 | La0.01Zr0.3 | Thick HC-absorbent (zeolite) layer | Pd/Ce-[A]-Ob | Fig.20 Carrier having high cell numbers is positioned upper side |
| Comparative example II 6 | HC-absorbent (zeolite) layer | Pd/Ce-[A]-Ob | La0.01Zr0.3 | — | Pd/Ce-Al2O3 | Fig.21 |

FIG.22D

Table II-4

| | Pt (g/L) | Pd (g/L) | Rh (g/L) | BaO (g/L) | HC absorption rate (%) | HC purification rate (%) |
|---|---|---|---|---|---|---|
| Example II-1 | — | 2.83 | — | 3.40 | 78 | 42 |
| Example II-2 | — | 2.83 | — | 3.40 | 79 | 44 |
| Example II-3 | — | 2.83 | — | 3.40 | 80 | 45 |
| Example II-4 | 0.71 | 1.88 | 0.24 | 1.70 | 79 | 46 |
| Example II-5 | 0.71 | 1.88 | 0.24 | 1.70 | 80 | 47 |
| Example II-6 | — | 2.83 | — | 3.40 | 75 | 40 |
| Example II-7 | — | 2.83 | — | 3.40 | 74 | 41 |
| Example II-8 | 0.71 | 1.88 | 0.24 | 1.70 | 75 | 41 |
| Example II-9 | 0.71 | 1.88 | 0.24 | 1.70 | 75 | 42 |
| Example II-10 | 0.71 | 1.88 | 0.24 | 1.70 | 80 | 47 |
| Example II-11 | 0.71 | 1.88 | 0.24 | 1.70 | 75 | 41 |
| Comparative example II-1 | — | 2.83 | — | 3.40 | 79 | 34 |
| Comparative example II-2 | — | 2.83 | — | 1.70 | 80 | 36 |
| Comparative example II-3 | — | 2.83 | — | 1.70 | 79 | 31 |
| Comparative example II-4 | — | 2.83 | — | 3.40 | 79 | 30 |
| Comparative example II-5 | — | 2.83 | — | 3.40 | 75 | 24 |
| Comparative example II-6 | — | 2.83 | — | 3.40 | 74 | 18 |

EXHAUST GAS PURIFYING CATALYST

BACKGROUND OF THE INVENTION

1. Field of the Invention

The present invention relates to an exhaust gas purifying catalyst that purifies carbon monoxide (CO), hydrocarbons (HC) and nitrogen oxides (NOx) in exhaust gas discharged from an internal combustion engine of a gasoline or diesel automobile, a boiler or the like. More particularly, the present invention relates to an exhaust gas purifying catalyst that purifies a large amount of HC discharged in a low temperature range at time of starting up an engine, in which a three-way catalyst is not activated.

2. Description of the Related Art

Heretofore, in order to purify exhaust gas from an internal combustion engine of an automobile or the like, a three-way catalyst that simultaneously performs oxidation for carbon monoxide (CO) and hydrocarbons (HC) and reduction for nitrogen oxides (NOx) has widely been used. However, since the temperature of the exhaust gas is low and the three-way catalyst disposed on an exhaust gas passage does not reach an activation temperature immediately after the start-up of the engine, a large amount of cold HC discharged in this case cannot be purified.

Recent years, for the purpose of purifying such cold HC, an HC-adsorbing/purifying catalyst (HC-trap catalyst) as a three-way catalyst having an HC adsorbing function has been developed, which includes a hydrocarbon adsorbent (HC adsorbent) and a purifying catalyst such as a three-way catalyst.

The HC-trap catalyst temporarily adsorbs and holds cold HC discharged in the low temperature range at the time of starting up the engine, in which the three-way catalyst is not activated. Then, the HC-trap catalyst gradually desorbs the HC and purifies the desorbed HC by the purifying catalyst when the three-way catalyst is activated due to a temperature increase of the exhaust gas.

As the HC adsorbent, zeolite is generally used. As the catalyst purifying the HC desorbed from the HC adsorbent, a catalyst obtained by mixing noble metal species such as rhodium (Rh), platinum (Pt) and palladium (Pd) on the same layer and a catalyst of a multilayer structure including Rh and Pd layers have been proposed.

Japanese Patent Laid-Open Publication H2-56247 (published in 1990) discloses an exhaust gas purifying catalyst including a first layer mainly containing zeolite and a second layer provided on the first layer. The second layer mainly contains noble metals such as Pt, Pd and Rh.

Other HC-trap catalysts have been disclosed in Japanese Patent Laid-Open Publications H6-74019 (published in 1994), H7-144119 (published in 1995), H6-142457 (published in 1994), H5-59942 (published in 1993), H7-102957 (published in 1995), H7-96183 (published in 1995) and H11-210451 (published in 1999).

SUMMARY OF THE INVENTION

In the case of using the conventional HC-trap catalyst, the cold HC adsorbed to the HC adsorbent at the time of starting up the engine starts to be desorbed as the temperature increases. However, since the starting temperature of HC desorption is lower than the starting temperature of three-way catalyst activation, early-desorbed HC is discharged without being purified by the three-way catalyst in the HC-trap catalyst. In order to further improve purification efficiency for HC in the exhaust gas purifying system as a whole, it is necessary to control the discharge of such unpurified HC.

Moreover, since an oxidation reaction occurs when the adsorbed HC is desorbed and purified, an atmosphere around the purifying catalyst layer of the HC-trap catalyst falls in a state of oxygen shortage. Since the three-way catalyst exhibits the best action of the purifying catalyst in the range of the stoichiometric air/fuel ratio, it cannot exert the action of the purifying catalyst sufficiently in the atmosphere where oxygen is short. Therefore, HC, CO and NOx cannot be purified in good balance, and it becomes difficult to enhance the purification efficiency for the cold HC sufficiently.

In order to enhance the purification efficiency for the cold HC, the following purifying methods have been studied. In one purifying method, a switching of an exhaust gas passage controls adsorbed HC to be desorbed after the three-way catalyst is sufficiently activated, and the desorbed HC is purified by the three-way catalyst. In another purifying method, an electric heater raises the temperature of a three-way catalyst to accelerate an activation of the three-way catalyst. In the other purifying method, an introduction of external air accelerates an activation of the three-way catalyst. However, these methods are costly because of complex system configurations, and purification efficiency for the cold HC cannot be sufficiently enhanced.

Moreover, in an HC-trap catalyst, the temperature and gas atmosphere differ on the upstream side and the downstream side in the exhaust gas flow that is discharged from the engine into the HC-trap catalyst. The temperature of the exhaust gas is high on the upstream side closer to the engine, and is lowered toward the downstream. Such a difference between the upstream and the downstream in the temperature condition occurs also in a single HC-trap catalyst. For example, in an HC-trap catalyst that uses a honeycomb carrier having a plurality of cells serving as exhaust gas passages, the temperature of the exhaust gas flowing in each cell differs on the upstream side and the downstream side.

Moreover, since an adsorbing/desorbing reaction for HC and a purifying reaction for HC occur in each cell, the gas atmosphere also differs in the upstream region and the downstream region as these reactions proceed. However, since the same configuration and composition are formed from the upstream region to the downstream region in the HC-trap catalyst of the conventional type, the optimum configuration and composition have not been realized in each region of the HC-trap catalyst.

An object of the present invention is to provide an exhaust gas purifying catalyst that purifies HC discharged in the low temperature range at the time of starting up the engine more efficiently.

An exhaust gas purifying catalyst according to a first aspect of the present invention includes a carrier having a plurality of cells as exhaust gas passages, an HC adsorbent layer formed on the carrier of each of the cells, an upper catalyst layer disposed on an upstream side of each of the exhaust gas passages on the HC adsorbent layer and a lower catalyst layer disposed on a downstream side of each of the exhaust gas passages on the HC adsorbent layer. The upper catalyst layer contains more $O_2$-storage material than the lower catalyst layer. The lower catalyst layer contains a catalyst having a wider activation range than that of the upper catalyst layer. Note that the catalyst having the wider activation range means a catalyst having wide temperature and gas atmosphere conditions required for exerting a catalytic function.

An exhaust gas purifying catalyst according to a second aspect of the present invention includes a carrier having a plurality of cells as exhaust gas passages, an HC adsorbent layer formed on at least an upstream region on the carrier of each of the cells, and a purifying catalyst layer formed on the HC adsorbent layer. Here, a substantial cross-sectional area on a downstream side of the exhaust gas passage is made narrower than a substantial cross-sectional area on an upstream side thereof. Moreover, the purifying catalyst layer includes an upper catalyst layer disposed on an upstream side of each of the exhaust gas passages and a lower catalyst layer disposed on a downstream side of each of the exhaust gas passage. The upper catalyst layer contains more $O_2$-storage material than the lower catalyst layer. The lower catalyst layer contains a catalyst having a wider activation range than that of the upper catalyst layer.

BRIEF DESCRIPTION OF THE DRAWINGS

FIGS. 6A and 6B are tables showing conditions of exhaust gas purifying catalysts in examples I-1 to I-11 and comparative examples I-1 to I-5 according to the first embodiment, and FIG. 6C is a table showing total amounts of noble metals contained in the exhaust gas purifying catalysts, and showing HC adsorption rates and HC purification rates of the exhaust gas purifying catalysts, which have been measured by use of the purifying system shown in FIG. 5.

FIGS. 22A to 22C are tables showing conditions of the exhaust gas purifying catalysts of the examples II-1 to II-11 and the comparative examples II-1 to II-6 according to the second embodiment, and FIG. 22D is a table showing total amounts of noble metals contained in the exhaust gas purifying catalysts, and showing HC adsorption rates and HC purification rates of the exhaust gas purifying catalysts, which have been measured by use of the purifying system shown in FIG. 5.

DESCRIPTION OF THE PREFERRED EMBODIMENTS (First Embodiment)

Figure 1:
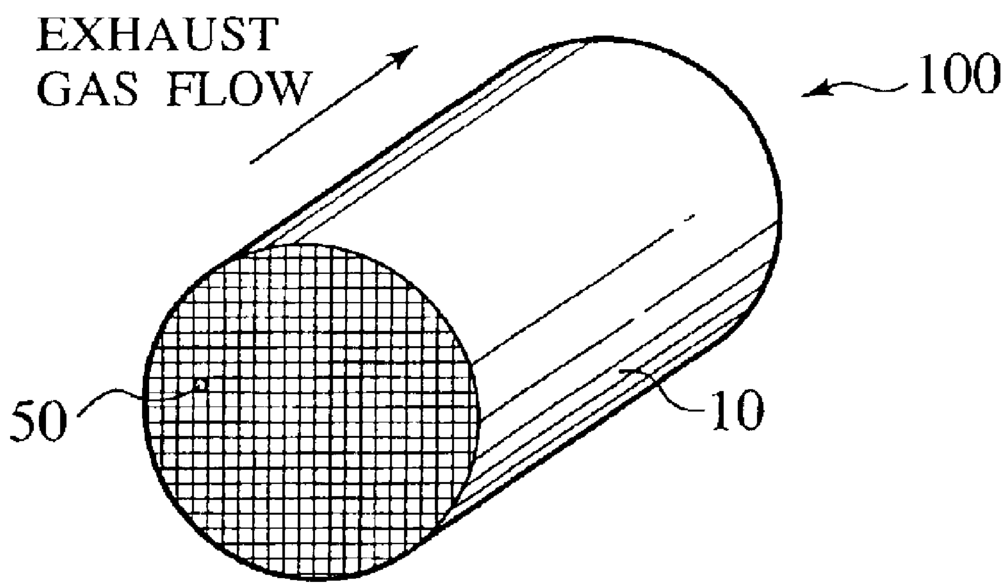
FIG. 1 is a perspective view of an exhaust gas purifying catalyst according to a first aspect of the present invention.

As shown in FIG. 1, an exhaust gas purifying catalyst according to a first embodiment of the present invention is an HC-trap catalyst 100 that has an HC adsorbent layer and a catalyst layer in a honeycomb carrier 10 having a plurality of cells 50 serving as exhaust gas passages.

The HC-trap catalyst 100 according to the first embodiment is characterized by including a purifying catalyst layer composed differently on an upstream side and a downstream side of an exhaust gas flow.

Figure 2A:
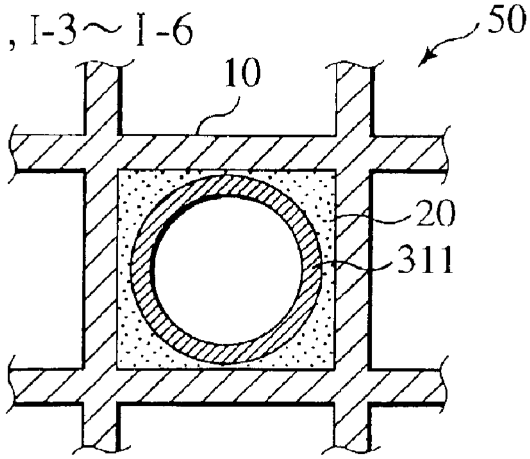
FIGS. 2A and 2B are enlarged cross-sectional views, each showing a cross section perpendicular to an exhaust gas flow in a cell of the exhaust gas purifying catalyst of the first embodiment.
Figure 2B:
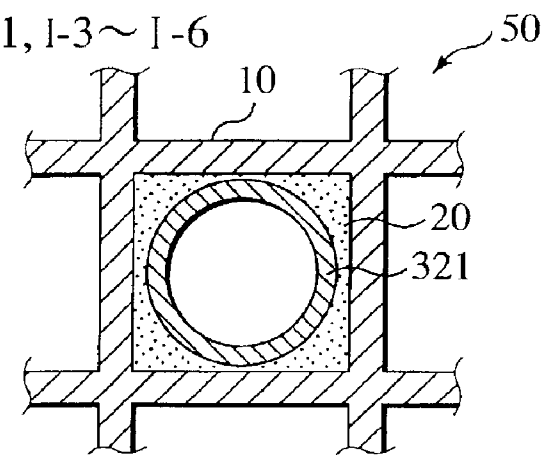
Figure 2C:
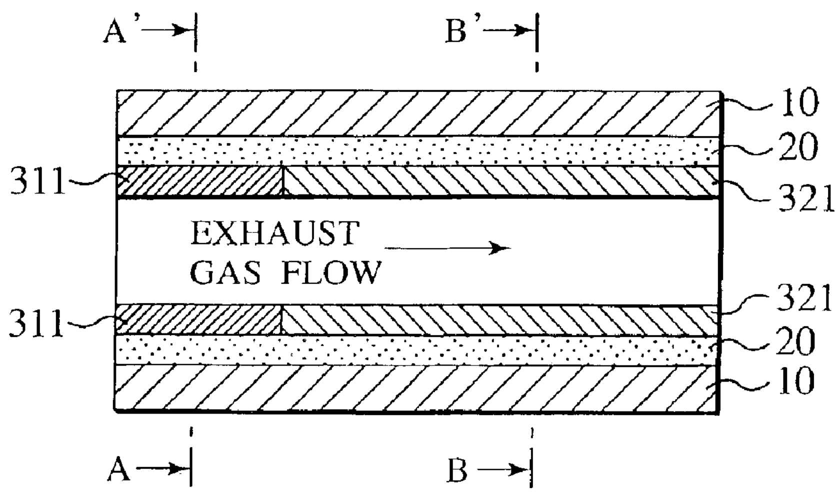
FIG. 2C is an enlarged cross-sectional view showing a cross-section parallel to the exhaust gas flow in the cell.

FIGS. 2A to 2C show the cell structure of the HC-trap catalyst 100 according to the first embodiment. As shown in FIGS. 2A to 2C, an HC adsorbent layer 20 mainly containing zeolite is formed on the carrier 10 of each cell, and the purifying catalyst layer is formed on the HC adsorbent layer 20. The purifying catalyst layer is divided into an upper catalyst layer 311 disposed on the upstream side of the exhaust gas flow and a lower catalyst layer 321 disposed on the downstream side thereof. The upper catalyst layer 311 contains more $O_2$-storage material than the lower catalyst layer 321. The lower catalyst layer 321 contains a catalyst having a wider activation range than that of the upper catalyst layer 311.

The $O_2$-storage material is a material having an oxygen storage capability. When a circumambient atmosphere thereof becomes short of oxygen, the $O_2$-storage material exerts an oxygen emission function. The catalyst having the wide activation range means a catalyst having a wide condition showing an activation state, that is, the purifying catalyst functions as a purifying under wide temperature and gas atmosphere conditions. Concretely, such a catalyst means a catalyst showing the activation state under the condition where the temperature is lower or where the concentration of oxygen is lower.

The exhaust gas in the upstream region, which flows in the cell 50, has high temperature because it is closer to the engine. The upper catalyst layer 311 in contact with the exhaust gas raises its temperature rapidly and is activated early, and the HC purifying reaction proceeds. However, since oxygen is consumed in the HC purifying reaction, the downstream region of the cell is apt to fall in the shortage of oxygen. When shortage of oxygen occurs, the activation function of the catalyst contained in the catalyst layer is lowered. However, in the HC-trap catalyst according to the first embodiment, the $O_2$-storage material contained much in the upper catalyst layer 311 emits oxygen when the concentration of circumambient oxygen is lowered, and solves the shortage of oxygen which is apt to occur on the downstream side of the cell, in order to maintain the concentration of circumambient oxygen constantly. Thus, it is made possible to accelerate the purifying reaction for HC desorbed from the HC adsorbent layer 20.

Figure 5:
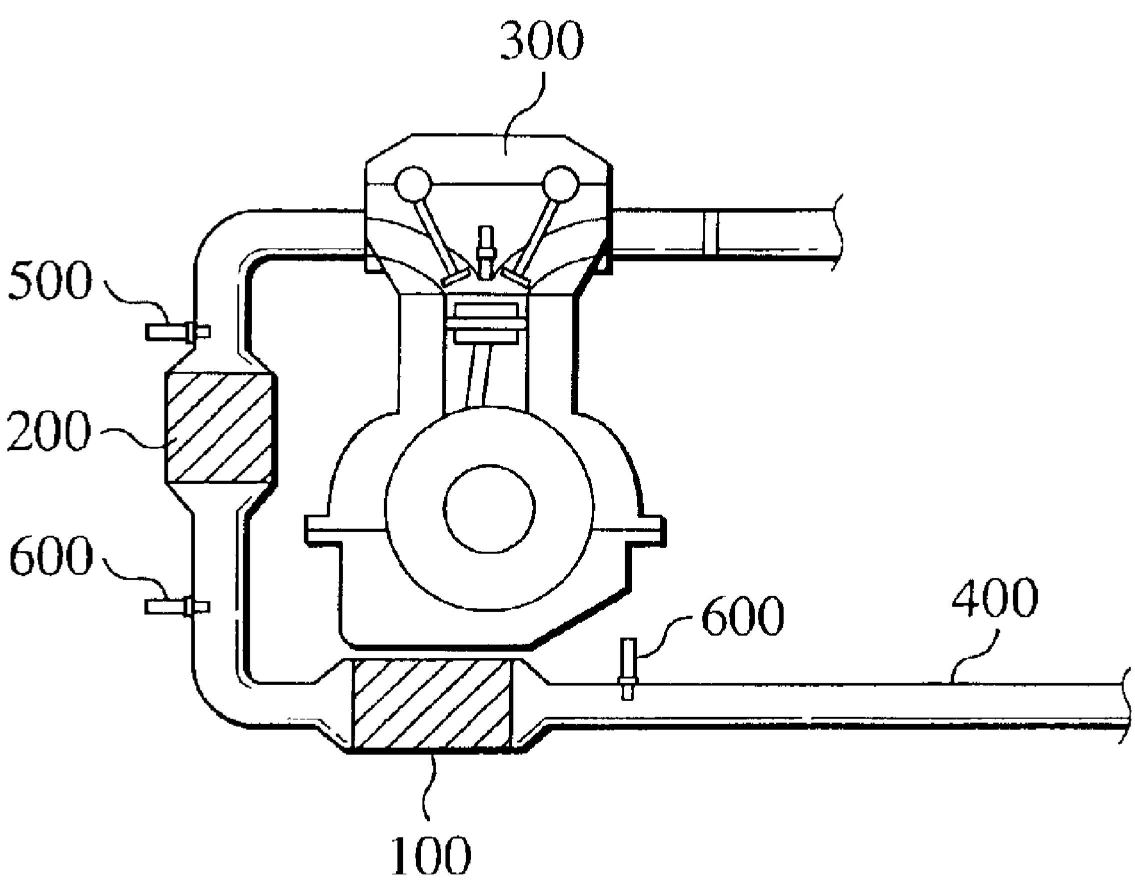
FIG. 5 is a view showing a configuration of a purifying system for use in evaluating purification efficiencies of the catalysts.

In the case of using an exhaust gas purifying system as shown in FIG. 5, since the three-way catalyst is provided upstream of the HC-trap catalyst, oxygen in the exhaust gas is consumed by the catalytic reaction of the three-way catalyst after the three-way catalyst is activated. Accordingly, the oxygen concentration is low even if the air/fuel ratio in the exhaust gas is stoichiometric ratio. When the purifying reaction proceeds in the HC-trap catalyst, the oxygen concentration of the downstream region of the cell becomes lower. Therefore, the oxygen emission effect in the upstream region of the HC-trap catalyst, which is caused by the $O_2$-storage material, becomes far more important.

As the $O_2$-storage material, for example, a cerium oxide is available. Specifically, as such a cerium oxide, an oxide compound of cerium and an element A, which is represented as Ce-[A]-Ob, is available. The element A is at least one selected from the group consisting of zirconium, lanthanum, yttria, praseodymium and neodymium.

Each of the upper catalyst layer 311 and the lower catalyst layer 321 contains a noble metal as a catalyst component supported on the oxide and the like. Since the cerium oxide as the $O_2$-storage material has a smaller BET surface area than alumina and the like, it cannot support the noble metal expressing the catalytic function in high dispersion. Accordingly, it is desirable to mainly use alumina that can support the noble metal in higher dispersion than the cerium oxide for the lower catalyst layer 321. The noble metal as the catalyst is supported on the alumina in high dispersion, and thus the contact efficiency for the exhaust gas and the catalyst is enhanced, resulting in the widening of an activation range of the catalyst. As described above, since the temperature of the exhaust gas on the downstream side of the cell 50 is lower than that on the upstream side, the rise of temperature in the lower catalyst layer 321 is slower than in the upstream side. However, since the lower catalyst layer 321 contains the catalyst having the wider activation range than the upper catalyst layer 311, the lower catalyst layer 321 can start the activation even in the region where the concentration of oxygen is lower. Therefore, the purifying reaction for the desorbed HC can be accelerated.

It is desirable to mainly use Ce-[A]-Ob as a catalyst supporter in the upper catalyst layer 311 and to mainly use alumina as a catalyst supporter in the lower catalyst layer 321.

Moreover, it is desirable to start the activation of the upper catalyst layer 311 earlier and to use a catalyst activated in a range from 150 to 300° C. Accordingly, it is desirable to use Pd in which the starting temperature of activation is relatively low as a catalyst component for the upper catalyst layer 311. Meanwhile, for the lower catalyst layer 321, it is desirable to use a catalyst that is activated in the relatively low temperature and has a wide activation range capable of being activated even in the state of oxygen shortage. Therefore, it is desirable to use a catalyst containing Pt, Rh or the like in addition to the catalyst containing Pd.

Concretely, in the cell shown in FIG. 2C, the upper catalyst layer 311 mainly uses Pd-supported Ce-[A]-Ob, and the lower catalyst layer 321 mainly uses Pd supported Ce—$Al_2O_3$. Note that Ce—$Al_2O_3$ represents Ce doped $Al_2O_3$. Since the Ce—$Al_2O_3$ contains Ce, oxygen emission action is obtained. Also the Ce—$Al_2O_3$ can support Pd in high dispersion since alumina is a base material. Therefore, the contact efficiency and contact time of the exhaust gas and Pd as the catalyst are enhanced, thus making it possible to activate the catalyst at the lower temperature and the lower concentration of oxygen. Specifically, since the lower catalyst layer 321 has the wide activation range in accordance with the catalyst component on the upstream side, it is possible to improve the HC purification efficiency of the HC-trap-catalyst 100 as a whole.

Note that Pd-supported Ce—$Al_2O_3$ may be added to the upper catalyst layer 311. In this case, dispersibility of Ce and Pd is improved, and the HC purification efficiency can be improved.

The lower catalyst layer 321 may contain any of Pd-supported Ce—$Al_2O_3$, Pt-supported Ce—$Al_2O_3$, Rh-supported Zr—$Al_2O_3$, Pt-supported LaCe—$ZrO_2$, or an arbitrary combination thereof.

In the exhaust gas purifying catalyst according to the first embodiment, preferably, the carrier is of a monolithic structure, and the upper catalyst layer is provided in a range from 50 to 90% of the overall length of the carrier from the upstream side to the downstream side.

The honeycomb carrier can be separated into two carriers on the upstream side and the downstream side, and catalyst layers different in composition from each other can be formed on the two separated carriers, respectively. However, when the monolithic structure is employed, and the upper and lower catalyst layer 311 and 321 different in composition from each other are provided in one carrier, then the escape of heat to the outside can be rather controlled, and the lower catalyst layer 321 can be rather heated up early to be activated. Therefore, in this case, it is possible to obtain higher HC purification efficiency than in the case when the carrier is separated into two.

Although zeolite can be used as the HC adsorbent layer 20, no particular limitations are imposed on materials therefor. In the case of using zeolite, adsorptivity thereof for the cold HC is affected by a relationship between the composition of HC species in the exhaust gas and a pore diameter of the zeolite. Therefore, it is preferable to select and use zeolite having the optimum pore diameter, distribution and skeletal structure.

Although an MFI type is generally used, zeolite having another pore diameter, for example, USY is singly used, or plural types of such zeolites are mixed, and thus the pore diameter distribution of zeolite is controlled. However, after a long-time use, because of differences in distortion of pore diameter and adsorption/desorption characteristics depending on types of zeolites, adsorption of the HC species in the exhaust gas becomes insufficient.

As an HC adsorbent used for the HC adsorbent layer 20, H type β-zeolite having a Si/2Al ratio set at a range of 10 to 1000 is available. Since this H type β-zeolite has a wide pore distribution and high heat resistance, the H type β-zeolite is suitable from a viewpoint of improvements of the HC adsorption efficiency and heat resistance.

In addition, if one selected from MFI, Y type zeolite, USY, mordenite and ferrierite or an arbitrary mixture thereof is used as the HC adsorbent in combination with the H type β-zeolite, then the pore diameter distribution of the material can be expanded. Therefore, the HC adsorption efficiency of the HC adsorbent layer can be further improved.

For the HC adsorbent layer 20, besides the above zeolite-based materials, one selected from palladium (Pd), magnesium (Mg), calcium (Ca), strontium (Sr), barium (Ba), silver (Ag), yttrium (Y), lanthanum (La), cerium (Ce), neodymium (Nd), phosphorus (P), boron (B) and zirconium (Zr) or a mixture thereof can be added. Since the adsorptivity and heat resistance of zeolite can be accordingly enhanced more, it is possible to delay the desorption of the adsorbed HC.

In addition, the HC adsorbent layer 20 may contain the above-described zeolite as a main component, and may further contain one selected from Pt, Rh and Pd or a mixture thereof, zirconium oxide containing 1 to 40 mol %, in metal, of one selected from Ce, Nd, praseodymium (Pr) and La or a mixture thereof, and alumina. Accordingly, since the purifying catalyst components are added to the HC adsorbent layer 20, it is possible to improve the purification efficiency for the desorbed HC.

No particular limitations are imposed on materials for the honeycomb carrier 10, and conventionally known materials can be used. Concretely, cordierite, metal and silicon carbide can be used.

Although the HC-trap catalyst according to the first embodiment has been described above, the upper catalyst layer and the lower catalyst layer do not necessarily have to be located in two completely separate regions, and may be partially overlapped each other. In addition, the HC-trap catalyst may be formed such that the composition thereof is gradually changed from the upstream side to the downstream side.

EXAMPLES I

The table of FIG. 6A shows specifications of catalysts in examples I-1 to I-9, and the table of FIG. 6B shows specifications of catalysts in comparative examples I-1 to I-5.

Example I-1

FIGS. 2A to 2C show the structure of the HC-trap catalyst of the example I-1. In the HC-trap catalyst of the example I-1, the upper catalyst layer 311 contains Pd-supported Ce-[A]-Ob. Concretely, as Ce-[A]-Ob, $La_{0.01}Ce_{0.69}Zr_{0.3}Ob$ was used. The lower catalyst layer 321 contains Pd-supported Ce—$Al_2O_3$.

The respective catalyst layers were prepared by the following methods.

<HC Adsorbent Layer 20>

800 g of β-zeolite powder (Si/2Al=35), 1333.3 g of silica sol (solid part 15%) and 1000 g of pure water were poured into a ball mill pot made of alumina, then were milled for 60 minutes, and thus a slurry solution was obtained. This slurry solution was coated on a monolithic carrier of 300 cells/6 mills (46.5 cells/$cm^2$, wall thickness 0.0152 cm) and of a catalyst capacity 1.0 L, dried for 30 minutes in an air flow of 50° C. after removing extra slurry in the cells by an air flow, then baked at 400° C. for an hour after drying for 15 minutes in an air flow of 150° C. The weight of the coating layer after the baking was 350 g/$dm^3$. Thus, the HC adsorbent layer 20 was obtained.

<Upper Catalyst Layer 311>

Cerium oxide powder (Ce 69 mol %) containing 1 mol % of La and 30 mol % of Zr was impregnated with a palladium nitrate aqueous solution, or sprayed therewith while the cerium oxide powder was stirred at a high speed. After the cerium oxide powder was dried at 150° C. for 24 hours, the dried cerium oxide powder was baked at 400° C. for an hour, and then at 600° C. for an hour, and thus Pd-supported cerium oxide powder (powder-b) was obtained. The Pd concentration of this "powder-b" was 1.0%.

314 g of the foregoing Pd-supported cerium oxide powder (powder-b), 190 g of nitric acid alumina sol (19 g, in $Al_2O_3$, of sol obtained by adding 10% of nitric acid to 10% of boehmite alumina) and 2000 g of pure water were poured into a magnetic ball mill, then were mixed and milled, and thus a slurry solution was obtained. This slurry solution was coated on one-third portion of the foregoing HC adsorbent layer 20, which corresponds to the exhaust gas entrance side (upstream side), dried after removing extra slurry in the cells by an air flow, and baked at 400° C. for an hour. The weight of the coating layer after the baking was 33.3 g/$dm^3$. Thus, the upper catalyst layer 311 was obtained.

<Lower Catalyst Layer 321>

Alumina powder (Al 97 mol %) containing 3 mol % of Ce was impregnated with a palladium nitrate aqueous solution, or sprayed therewith while the alumina powder was stirred at a high speed. After the alumina powder was dried at 150° C. for 24 hours, the dried alumina powder was baked at 400° C. for an hour, and then at 600° C. for an hour, and thus Pd-supported alumina powder (powder-a) was obtained. The Pd concentration of this "powder-a" was 4.0%.

628 g of the foregoing Pd supported alumina powder (powder-a), 140 g of nitric acid alumina sol (14 g, in $Al_2O_3$, of sol obtained by adding 10% of nitric acid to 10% of boehmite alumina), 25 g of barium carbonate (17 g of BaO) and 2000 g of pure water were poured into a magnetic ball mill, then were mixed and milled, and thus a slurry solution was obtained. This slurry solution was coated on two-thirds portion of the foregoing HC adsorbent layer 20, which corresponded to the downstream side of the exhaust gas, dried after removing extra slurry in the cells by an air flow, and baked at 400° C. for an hour. The weight of the coating layer after the baking was 66.7 g/$dm^3$. Thus, the lower catalyst layer 321 was obtained.

Example I-2

Figure 3:
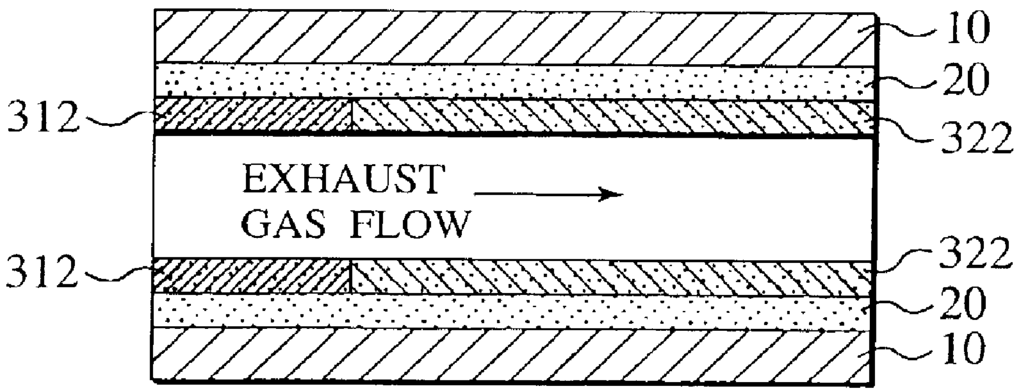
FIG. 3 is an enlarged cross-sectional view showing a cross section parallel to an exhaust gas flow in a cell of another exhaust gas purifying catalyst in the first embodiment.

FIG. 3 shows the structure of the HC-trap catalyst of the example I-2. In the HC-trap catalyst of the example I-2, the upper catalyst layer 312 contains Pd-supported Ce-[A]-Ob and Pd-supported Ce—$Al_2O_3$. Similarly to the example I-1, as Ce-[A]-Ob, $La_{0.01}Ce_{0.69}Zr_{0.3}Ob$ was used. The lower catalyst layer 322 contains Pt-supported Ce—$Al_2O_3$, Rh-supported Zr—$Al_2O_3$, Pt-supported LaCe—$ZrO_2$.

The HC adsorbent layer 20 was prepared in the similar method to that of the example I-1, and the upper catalyst layer 312 and the lower catalyst layer 322 were prepared by the following methods, respectively.

<Upper Catalyst Layer 312>

Alumina powder (Al 97 mol %) containing 3 mol % of Ce was impregnated with a palladium nitrate aqueous solution, or sprayed therewith while the alumina powder was stirred at a high speed. After the alumina powder was dried at 150° C. for 24 hours, the dried alumina powder was baked at 400° C. for an hour, and then at 600° C. for an hour, and thus Pd supported alumina powder (powder-c) was obtained. The Pd concentration of this "powder-c" was 8.0%.

Cerium oxide powder (Ce 69 mol %) containing 1 mol % of La and 30 mol % of Zr was impregnated with a palladium nitrate aqueous solution, or sprayed therewith while the cerium oxide powder was stirred at a high speed. After the cerium oxide powder was dried at 150° C. for 24 hours, the dried cerium oxide powder was baked at 400° C. for an hour, and then at 600° C. for an hour, and thus Pd supported cerium oxide powder (powder-d) was obtained. The Pd concentration of this powder d was 4.0%.

200 g of the foregoing Pd supported alumina powder (powder-c), 71 g of the foregoing Pd supported cerium oxide powder (powder-d), 120 g of nitric acid alumina sol (12 g, in $Al_2O_3$, of sol obtained by adding 10% of nitric acid to 10% of boehmite alumina), 50 g of barium carbonate (33 g of BaO) and 1000 g of pure water were poured into a magnetic ball mill, then were mixed and milled, and thus a slurry solution was obtained. This slurry solution was coated on one-third portion of the HC adsorbent layer 20 prepared in advance by the similar method to that of the example I-1, which corresponds to the exhaust gas entrance side (upstream side), dried after removing extra slurry in the cells by an air flow, and baked at 400° C. for an hour. The weight of the coating layer after the baking was 33.3 g/$dm^3$. Thus, the upper catalyst layer 312 was obtained.

<Lower Catalyst Layer 322>

Alumina powder (Al 97 mol %) containing 3 mol % of Zr was impregnated with a rhodium nitrate aqueous solution, or sprayed therewith while the alumina powder was stirred at a high speed. After the alumina powder was dried at 150° C. for 24 hours, the dried alumina powder was baked at 400° C. for an hour, and then at 600° C. for an hour, and thus Rh supported alumina powder (powder-e) was obtained. The Rh concentration of this "powder-e" was 1.5%.

Alumina powder (Al 97 mol %) containing 3 mol % of Ce was impregnated with a dinitro diamine platinum aqueous solution, or sprayed therewith while the alumina powder was stirred at a high speed. After the alumina powder was dried at 150° C. for 24 hours, the dried alumina powder was baked at 400° C. for an hour, and then at 600° C. for an hour, and thus Pt supported alumina powder (powder-f) was obtained. The Pt concentration of this powder f was 1.5%.

Zirconium oxide powder containing 1 mol % of La and 20 mol % of Ce was impregnated with a dinitro diamine platinum aqueous solution, or sprayed therewith while the zirconium oxide powder was stirred at a high speed. After the zirconium oxide powder was dried at 150° C. for 24 hours, the dried zirconium oxide powder was baked at 400° C. for an hour, and then at 600° C. for an hour, and thus Pt supported zirconium oxide powder (powder-g) was obtained. The Pt concentration of this "powder-g" was 1.5%.

157 g of the foregoing Rh supported alumina powder (powder-e), 236 g of the foregoing Pt supported alumina powder (powder-f), 236 g of the foregoing Pt supported zirconium oxide powder (powder-g) and 380 g of nitric acid alumina sol were poured into a magnetic ball mill, then were mixed and milled, and thus a slurry solution was obtained. This slurry solution was coated on two-thirds portion of the foregoing HC adsorbent layer 20 prepared in advance by the similar method to that of the example I-1, which corresponds to the exhaust gas emission side (downstream side), dried after removing extra slurry in the cells by an air flow, and baked at 400° C. for an hour. The weight of the coating layer after the baking was 66.7 g/dm$^3$. Thus, the lower catalyst layer 322 was obtained.

The total noble metal supported amounts of the upper catalyst layer 312 and the lower catalyst layer 322 were 0.71 g/dm$^3$ for Pt, 1.88 g/dm$^3$ for Pd, and 0.24 g/dm$^3$ for Rh.

Examples I-3 to I-6

The following HC-trap catalysts were prepared by use of the similar method to the method of the example I-1. As shown in FIGS. 2A to 2C, each of the HC-trap catalysts contains Pd-supported Ce-[A]-Ob in the upper catalyst layer 311 and Pd-supported Ce—$Al_2O_3$ in the lower catalyst layer 321. As Ce-[A]-Ob, $La_{0.01}Ce_{0.69}Pr_{0.3}Ob$ was used in the example I-3, $La_{0.01}Ce_{0.69}Nd_{0.3}Ob$ was used in the example I-4, $La_{0.01}Ce_{0.69}Pr_{0.2}Nd_{0.1}Ob$ was used in the example I-5, and $La_{0.01}Ce_{0.69}Zr_{02}Pr_{0.1}Ob$ was used in the example I-6.

Examples I-7 to I-11

The following HC-trap catalysts were prepared by use of the similar method to the method of the example I-2. As shown in FIG. 3, each of the HC-trap catalysts contains Pd-supported Ce-[A]-Ob and Pd-supported Ce—$Al_2O_3$ in the upper catalyst layer 312, and contains Pd-supported Ce—$Al_2O_3$, Rh-supported Zr—$Al_2O_3$, Pt-supported LaCe—$ZrO_2$ in the lower catalyst layer 322 similarly to the example I-2.

As Ce-[A]-Ob, $La_{0.01}Ce_{0.69}Pr_{0.3}Ob$ was used in the example I-7, $La_{0.01}Ce_{0.69}Nd_{0.3}Ob$ was used in the example I-8, $La_{0.01}Ce_{0.69}Pr_{0.2}Nd_{0.1}Ob$ was used in the example I-9, $La_{0.01}Ce_{0.69}Y_{0.3}Ob$ was used in the example I-10, and $La_{0.01}Ce_{0.69}Zr_{0.2}Y_{0.1}Ob$ was used in the example I-11.

Comparative Example I-1

Figure 4:
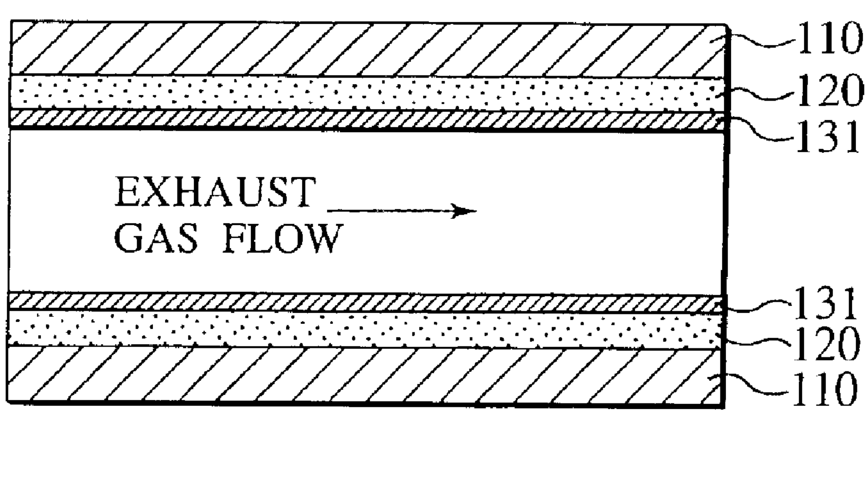
FIG. 4 is an enlarged cross-sectional view showing a cross section parallel to an exhaust gas flow in a cell of an exhaust gas purifying catalyst of a comparative example according to the first embodiment.

FIG. 4 shows the structure of the HC-trap catalyst of the comparative example I-1. The HC-trap catalyst of the comparative example I-1 includes a catalyst layer having the same composition on the upstream and the downstream. As shown in FIG. 4, the catalyst layer 131 is formed on the entire region of the HC adsorbent layer 120 prepared by the similar method to that of the example I-1.

Similarly to the upper catalyst layer 312 of the example I-2, the catalyst layer 131 contains Pd-supported Ce-[A]-Ob and Pd-supported Ce—$Al_2O_3$. As Ce-[A]-Ob, $La_{0.01}Ce_{0.69}Zr_{0.3}Ob$ was used.

The catalyst layer 131 was prepared under the following conditions.

<Catalyst Layer 131>

Alumina powder (Al 97 mol %) containing 3 mol % of Ce was impregnated with a palladium nitrate aqueous solution, or sprayed therewith while the alumina powder was stirred at a high speed. After the alumina powder was dried at 150° C. for 24 hours, the dried alumina powder was baked at 400° C. for an hour, and then at 600° C. for an hour, and thus Pd supported alumina powder (powder-a) was obtained. The Pd concentration of this "powder-a" was 4.0%.

Cerium oxide powder (Ce 69 mol %) containing 1 mol % of La and 30 mol % of Zr was impregnated with a palladium nitrate aqueous solution, or sprayed therewith while the cerium oxide powder was stirred at a high speed. After the cerium oxide powder was dried at 150° C. for 24 hours, the dried cerium oxide powder was baked at 400° C. for an hour, and then at 600° C. for an hour, and thus Pd supported cerium oxide powder (powder-h) was obtained. The Pd concentration of this "powder-h" was 2.0%.

565 g of the foregoing Pd supported alumina powder (powder-a), 283 g of the foregoing Pd supported cerium oxide powder (powder-h), 120 g of nitric acid alumina sol (12 g, in $Al_2O_3$, of sol obtained by adding 10% of nitric acid to 10% of boehmite alumina), 40 g of barium carbonate (27 g of BaO) and 2000 g of pure water were poured into a magnetic ball mill, then were mixed and milled, and thus a slurry solution was obtained. This slurry solution was coated on the HC adsorbent layer 120, dried after removing extra slurry in the cells by an air flow, and baked at 400° C. for an hour. The weight of the coating layer after the baking was 90.0 g/cm$^3$. Thus, the catalyst layer 131 was obtained.

The noble metal supported amount on the entire catalyst layers was 2.83 g/dm$^3$ for Pd.

Comparative Example I-2

The upper catalyst layer formed by the similar method to that of the catalyst layer 131 of the comparative example I-1 was formed on the region of about 90% of the overall length of the cell from the upper end. Note that 637 g of the Pd supported cerium oxide powder (concentration of supported Pd 4%) and 708 g of the Pd supported alumina powder (concentration of supported Pd 4%) were used. The lower catalyst layer was formed on the region of about 10% of the overall length of the cell from the lower end.

Comparative Example I-3

The Pd-supported Ce-[A]-Ob was not contained in the upper catalyst layer. The preparation method of the upper catalyst layer was conformed to the preparation method of the upper catalyst layer of the example I-2, and the Pd supported cerium oxide powder was not used, but 708 g of the Pd supported alumina powder (concentration of supported Pd 4%) was used. For the lower catalyst layer, the same one as the lower catalyst layer I-1 was used.

Comparative Example I-4

The catalyst of the example I-1 was cut into a catalyst unit where the upper catalyst layer was formed and a catalyst unit where the lower catalyst layer was formed, and these two catalysts were arrayed in tandem. Other than this, the catalyst was prepared under the similar condition to that of the example I-1.

Comparative Example I-5

The arrangement of the upper catalyst layer and the lower catalyst layer of the catalyst of the example I-1 was inverted. Other than this, the catalyst was prepared under the similar condition to that of the example I-1.

<Method of Evaluation>

Each of the catalysts of the examples I-1 to I-11 and the comparative examples I-1 to I-5 was used as the HC-trap catalyst 100 of the exhaust gas purifying system shown in FIG. 5, and the HC adsorption rate and the HC purification efficiency were measured. In this purifying system, the three-way catalyst 200 (capacity 1.0 $dm^3$ (L)) was disposed in the upstream region of the exhaust gas passage 400 for the gas exhausted from the engine 300, and the HC-trap catalyst 100 (capacity 1.0 $dm^3$ (L)) of the example or the comparative example was disposed in the downstream thereof. Note that an air/fuel ratio sensor 500 and an oxygen sensor 600 were provided on the exhaust gas passage 400. The three-way catalyst 200 was prepared under the following conditions. Moreover, for the evaluation conditions, the following were used. The results were shown in the table of FIG. 6C.

It was found out that the HC-trap catalysts of the examples I-1 to I-11 were superior in HC adsorbing/purifying capability to the catalysts of the comparative examples I-1 to I-5.

<Three-Way Catalyst>

530 g of the "powder-a", 236 g of the "powder-b", 70 g of nitric acid alumina sol (14 g, in $Al_2O_3$, of sol obtained by adding 10% of nitric acid to 10% of boehmite alumina), 40 g of barium carbonate (27 g of BaO) and 1000 g of pure water were poured into a magnetic ball mill, then were mixed and milled, and thus a slurry solution was obtained. This slurry solution was coated on a monolithic carrier of 900 cells/2 mills (139.5 cells/$cm^2$, wall thickness 0.0051 cm) and of a catalyst capacity 1.0 $dm^3$, dried after removing extra slurry in the cells by an air flow, and baked at 400° C. for an hour. The coating was carried out such that the weight of the coating layer after the baking was 78 g/$dm^3$. Thus, a "catalyst-a" was obtained.

313 g of the "powder-e", 100 g of zirconium oxide powder containing 1 mol % of La and 20 mol % of Ce, 170 g of nitric acid alumina sol (17 g, in $Al_2O_3$, of sol obtained by adding 10% of nitric acid to 10% of boehmite alumina) and 1000 g of pure water were poured into a magnetic ball mill, then were mixed and milled, and thus a slurry solution was obtained. This slurry solution was coated on the "catalyst-a", dried after removing extra slurry in the cells by an air flow, and baked at 400° C. for an hour. The coating was carried out such that the weight of the coating layer after the baking was 43 g/$dm^3$, and thus a catalyst was obtained. The noble metal supported amount on the catalyst was 2.35 g/$dm^3$ for Pd, and 0.47 g/$dm^3$ for Rh.

Similarly to the HC-trap catalyst according to the first embodiment, the HC-trap catalyst according to the second embodiment is characterized in that the upper catalyst layer contains more O2-storage material than the lower catalyst layer, and that the lower catalyst layer contains a catalyst having a wider activation range than the lower catalyst layer. Furthermore, the HC-trap catalyst according to the second embodiment is characterized in that the cross-sectional area of the exhaust gas passage in the downstream region thereof is narrow. Since the exhaust gas passage in the downstream region is narrow, the contact of the exhaust gas and the lower catalyst layer is enhanced, and the lower catalyst layer is heated rapidly by the heat of the exhaust gas and can be activated. Therefore, the HC purification efficiency of the HC-trap catalyst can be improved.

The HC-trap catalyst according to the second embodiment will be described below with reference to the drawings.

Figure 7A:
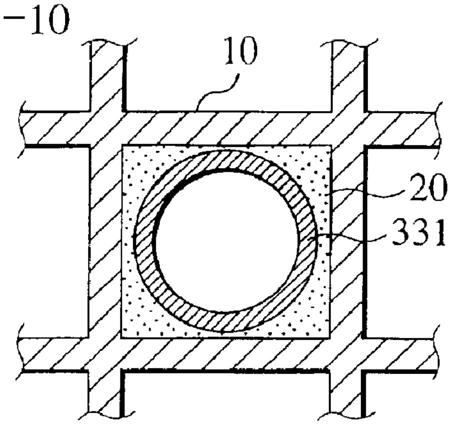
FIGS. 7A and 7B are enlarged cross-sectional views, each showing a cross section perpendicular to an exhaust gas flow in a cell of an exhaust gas purifying catalyst of an example II-1 and II-10 of a second embodiment.
Figure 7B:
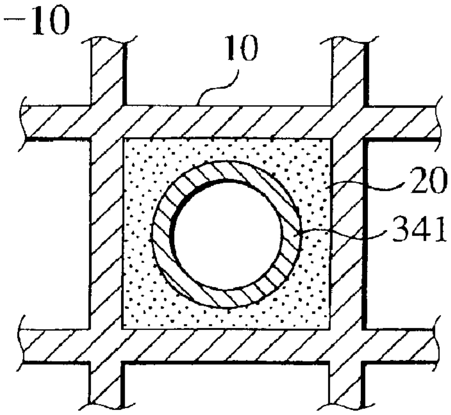
Figure 7C:
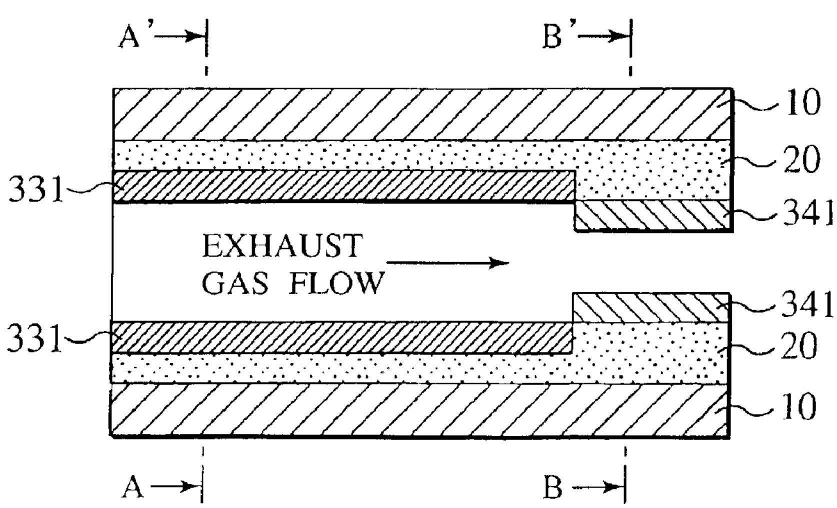
FIG. 7C is an enlarged cross-sectional view showing a cross-section parallel to the exhaust gas flow in the cell.

FIGS. 7A to 7C show the structural example of the cell of the first HC-trap catalyst according to the second embodiment. As shown in FIGS. 7A to 7C, the HC adsorbent layer 20 mainly containing zeolite is formed on the carrier 10 of each cell. The film thickness of the HC adsorbent layer 20 is made thicker in the downstream region than in the upstream region, and thus the substantial cross-sectional area of the exhaust gas passage in the downstream region becomes smaller than that in the upstream region. Specifically, in the first HC-trap catalyst, the coating amount of slurry of the HC adsorbent layer 20 is increased in the downstream region when the HC adsorbent layer 20 is formed on the carrier 10, and thus the thickness of the HC adsorbent layer 20 is thickened in the downstream region.

The upper catalyst layer 331 is stacked in the upstream region of the HC adsorbent layer 20, and the lower catalyst layer 341 is stacked in the downstream region of the HC adsorbent layer 20. The upper catalyst layer 331 contains more $O_2$-storage material than the lower catalyst layer 341, and the lower catalyst layer 341 contains the catalyst having the wider activation range than the upper catalyst layer 331.

Similarly to the HC-trap catalyst according to the first embodiment, preferably, the upper catalyst layer 331 mainly uses cerium oxide as an $O_2$-storage material as the catalyst supporter, and the lower catalyst layer 341 mainly uses alumina capable of highly dispersing the catalyst as the catalyst supporter. Preferably, in addition to Pd, the lower catalyst layer 341 mainly uses Pt, Rh or the like having a wide activation range.

Concretely, the upper catalyst layer 331 uses Pd-supported Ce-[A]-Ob as a main component. The refer-

| | |
|---|---|
| <Durability condition> | |
| Engine displacement | 3000 cc |
| Fuel | gasoline (Nisseki Dash) |
| Catalyst inlet gas temperature | 650° C. |
| Time of durability | 100 hours |
| <Vehicle performance test> | |
| Engine displacement | In-line four-cylinder 2.0 L engine by Nissan Motor Co., Ltd. |
| Method of evaluation | A-bag of LA4-CH of North America exhaust gas testing method |

(Second Embodiment)

Similarly to the exhaust gas purifying catalyst according to the first embodiment, the exhaust gas purifying catalyst according to the second embodiment of the present invention is a catalyst in which the catalyst composition and the catalyst structure are changed in the upstream region and the downstream region.

ence code A denotes at least one element selected from the group consisting of zirconium, lanthanum, yttria, praseodymium and neodymium. Note that Pd-supported Ce—$Al_2O_3$ may be mixed in the upper catalyst layer 331. The lower catalyst layer 341 may contain any of Pd-supported Ce—$Al_2O_3$, Pt-supported Ce—$Al_2O_3$, Rh-supported Zr—$Al_2O_3$, Pt-supported LaCe—$ZrO_2$, or an arbitrary combination thereof.

Since the first HC-trap catalyst shown in FIGS. 7A to 7C use the above-described upper catalyst layer 331 and lower catalyst layer 341, the HC purification efficiency thereof can be improved by the similar effect to that of the HC-trap catalyst according to the first embodiment. Moreover, since the cross-sectional area of the exhaust gas passage is narrowed in the downstream region, the contact efficiency of the lower catalyst layer 341 and the exhaust gas is enhanced, the heat of the exhaust gas heats the catalyst efficiently, and the catalyst can be activated rapidly. Note that it is desirable to heat up the lower catalyst layer 341 to a range from 100 to 400° C., and the lower catalyst layer 341 can also be controlled by use of a temperature sensor or the like during operation.

Figure 8:
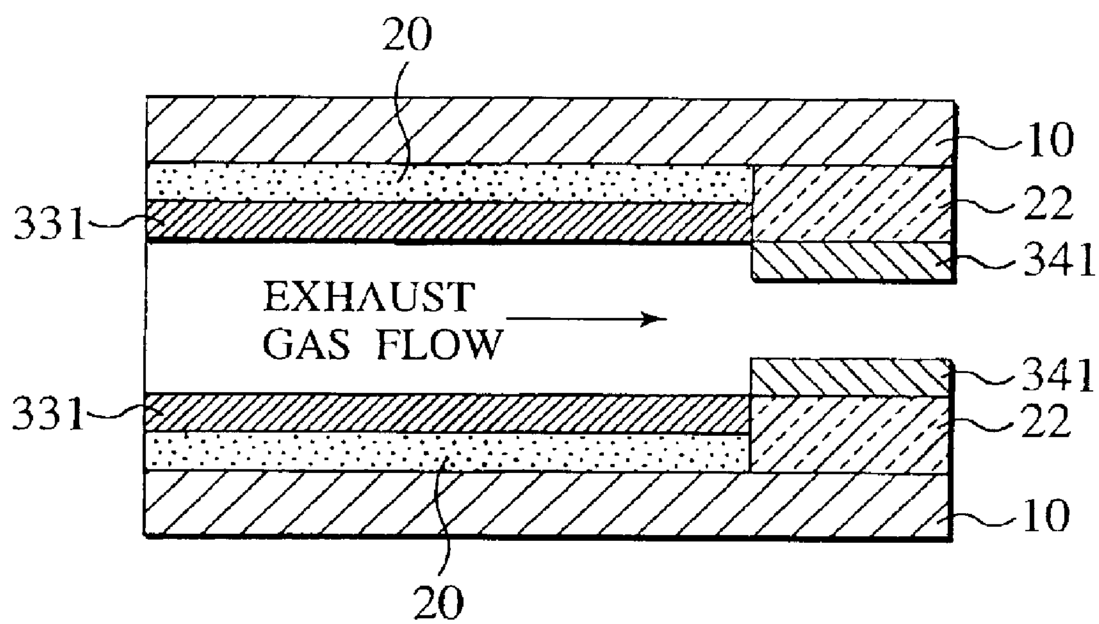
FIGS. 8 to 11 are enlarged cross-sectional views respectively showing cross sections parallel to exhaust gas flows in cells of exhaust gas purifying catalysts of examples II-2 to II-5 in the second embodiment.

Next, FIG. 8 shows the cell structure of the second HC-trap catalyst according to the second embodiment.

As shown in FIG. 8, in the second HC-trap catalyst, the HC adsorbent layer 20 mainly containing zeolite is formed only in the upstream region on the carrier 10 of each cell, and a heat-resistant inorganic oxide layer 22 mainly containing alumina is formed in the downstream region of the carrier 10. In the second HC-trap catalyst, the film thickness of the heat-resistant inorganic oxide layer 22 is made thicker than that of the HC adsorbent layer 20 in the upstream region, and thus the cross-sectional area of the exhaust gas passage is narrowed in the downstream region.

The upper catalyst layer 331 is formed on the HC adsorbent layer 20, and the lower catalyst layer 341 is formed on the heat-resistant inorganic oxide layer 22. For the upper catalyst layer 331 and the lower catalyst layer 341, a similar composition to that of the first HC-trap catalyst shown in FIGS. 7A to 7C can be used.

Also in the second HC-trap catalyst, the substantial cross-sectional area of the exhaust gas passage in the downstream region is narrowed by the heat-resistant inorganic oxide layer 22 formed in the downstream region of the cell, similarly to the first HC-trap catalyst. Therefore, the contact efficiency of the lower catalyst layer 341 and the exhaust gas is enhanced, thus making it possible to heat up the lower catalyst layer 341 rapidly.

The heat-resistant inorganic oxide layer 22 formed in the downstream region is denser than the HC adsorbent layer 20 having a high porosity, which is made of zeolite and the like. Therefore, when the HC diffused in the HC adsorbent layer 20 reach the heat-resistant inorganic oxide layer 22 in the downstream region, a diffusion flow thereof is disturbed there. Moreover, the diffusion rate of the HC slows down in the heat-resistant inorganic oxide layer 22. Since the desorption of the HC can be delayed in such a manner, the purification efficiency for the desorbed HC by the lower catalyst layer 341 can be improved. Note that the heat-resistant inorganic oxide layer 22 preferably contains γ-alumina having a particle diameter ranging from 1 to 3 $\mu$m as a main component.

The upper catalyst layer 331 formed on the HC adsorbent layer 20 can use Pd-supported Ce-[A]-Ob as a main component. Pd-supported Ce—$Al_2O_3$ may be mixed in the upper catalyst layer 331. The lower catalyst layer 341 formed on the heat-resistant inorganic oxide layer 22 may contain any of Pd-supported Ce—$Al_2O_3$, Pt-supported Ce—$Al_2O_3$, Rh-supported Zr—$Al_2O_3$, Pt-supported LaCe—$ZrO_2$, or an arbitrary combination thereof. In the HC-trap catalysts shown in FIGS. 9 to 11, the compositions of the upper catalyst layer and the lower catalyst layer of the HC-trap catalyst shown in FIG. 8 are changed.

Figure 12:
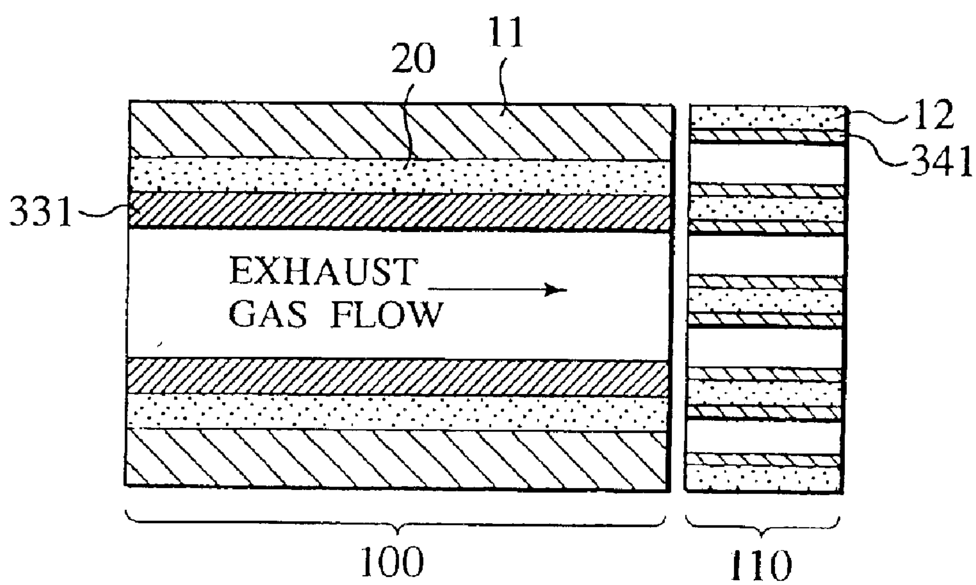
FIGS. 12 to 15 are enlarged cross-sectional views showing cross sections parallel to exhaust gas flows in cells of exhaust gas purifying catalysts of examples II-6 to II-9 and II-11 in the second embodiment.

Next, FIG. 12 shows the cell structure of the third HC-trap catalyst.

As shown in FIG. 12, the third HC-trap catalyst is an HC-trap catalyst that uses a first honeycomb carrier 11 having a small number of cells in the upstream region and uses a second honeycomb carrier 12 having a larger number of cells than the first honeycomb carrier 11 in the downstream region. The first honeycomb carrier 11 and the second honeycomb carrier 12 may be made monolithic completely. Alternatively, separate carriers may be used so as to be adjacent to each other.

The HC adsorbent layer 20 is formed on the first honeycomb carrier 11 provided on the upstream side, and the upper catalyst layer 331 is formed on the HC adsorbent layer 20. The lower catalyst layer 341 is formed directly on the second honeycomb carrier 12 provided on the downstream side. Preferably, the compositions of the respective catalyst layers 331 and 341 are made similar to that of the first HC-trap catalyst.

As described above, since the third HC-trap catalyst uses the second honeycomb carrier having a larger number of cells in the downstream region, the cross section of the exhaust gas passage in each cell of the downstream region can be narrowed. Therefore, the contact efficiency of the exhaust gas and the lower catalyst layer 341 formed on the second honeycomb carrier 12 is enhanced, and the temperature increase of the lower catalyst layer 341 can be accelerated. Concretely, the number of cells of the second honeycomb carrier 12 is desirably twice to five times the number of cells of the first honeycomb carrier 11.

Although the lower catalyst layer 341 is formed directly on the second honeycomb carrier 12, an HC adsorbent layer may be interposed between the second honeycomb carrier 12 and the lower catalyst layer 341.

The upper catalyst layer 331 can use Pd-supported Ce-[A]-Ob as a main component. Moreover, Ce—$Al_2O_3$ may be mixed in the upper catalyst layer 331. The lower catalyst layer 341 formed on the heat-resistant inorganic oxide layer 22 contain any of Pd-supported Ce—$Al_2O_3$, Pt-supported Ce—$Al_2O_3$, Rh-supported Zr—$Al_2O_3$, Pt-supported LaCe—$ZrO_2$, or an arbitrary combination thereof. In the HC-trap catalysts shown in FIGS. 13 to 15, the compositions of the upper catalyst layer and the lower catalyst layer of the third HC-trap catalyst are changed.

The first to third HC-trap catalysts according to the second embodiment have been described above. In the exhaust gas passage of each of the HC-trap catalysts, the contact rate and time of the exhaust gas on the downstream side of the catalyst portion can be increased when the average cross-sectional area $A_1$ of the exhaust gas passage on the upstream side and the average cross-sectional area $A_2$ of the exhaust gas passage on the downstream side satisfy a relationship of $A_1$:$A_2$=1:0.99 to 0.6. The average cross-sectional area Al on the upstream side means the substantial average cross-sectional area of the exhaust gas passage in the region where the upper catalyst layer 331 is formed. The average cross-sectional area $A_2$ on the downstream side means the substantial average cross-sectional area of the exhaust gas passage in the region where the lower catalyst layer 341 is formed.

When the honeycomb carrier is of a monolithic type, preferably, the upper catalyst layer 331 is formed on the upstream region of each cell, which occupies 50 to 90% of the overall length thereof. When the first honeycomb carrier 11 and the second honeycomb carrier 12 are separately formed, desirably, 50 to 90% of the overall length of cells, which is obtained by adding the cell length of the first honeycomb carrier 11 and the cell length of the second honeycomb carrier 12, is set as the cell length of the first honeycomb carrier 11. Specifically, the portion occupying 50 to 90% of the overall length of the cell in the upstream region is desirably set as the upper catalyst layer 331.

For the materials of the HC adsorbent layer 20 and the honeycomb carriers 10 to 12 used in the HC-trap catalyst according to the second embodiment, similar ones to those of the HC-trap catalyst according to the first embodiment can be used.

EXAMPLES II

The tables of FIGS. 22A and 22B show specifications of catalysts in examples II-1 to II-11, and the table of FIG. 22C shows specifications of catalysts in comparative examples II-1 to II-6.

Example II-1

FIGS. 7A to 7C show the structure of the HC-trap catalyst of the example II-1. In the HC-trap catalyst of the example II-1, the HC adsorbent layer 20 in the downstream region was thickened, and thus the cross-sectional area of the exhaust gas passage in the downstream region was narrowed. Moreover, the upper catalyst layer 331 mainly contains Pd-supported Ce-[A]-Ob. Concretely, $La_{0.01}Ce_{0.69}Zr_{0.3}Ob$ was used as Ce-[A]-Ob. The lower catalyst layer 341 mainly contains Pd-supported Ce—$Al_2O_3$.

The respective layers were prepared by the following methods.

<HC Adsorbent Layer 20>

800 g of β-zeolite powder (Si/2Al=35), 1333.3 g of silica sol (solid part 15 wt %) and 1000 g of pure water were poured into a ball mill pot made of alumina, then were milled for 60 minutes, and thus a slurry solution was obtained. This slurry solution was coated on a monolithic carrier of 300 cells/6 mills (46.5 cells/$cm^2$, wall thickness 0.0152 cm) and of a catalyst capacity 1.0 $dm^3$(L), dried for 30 minutes in an air flow of 50° C. after removing extra slurry in the cells by an air flow, then baked at 400° C. for an hour after drying for 15 minutes in an air flow of 150° C. The coating step was repeated until the amount of coating reached 300 g/$dm^3$ after the baking. Furthermore, the foregoing slurry was coated on the exhaust gas passage region of about one-fourth of the overall length of the cell of the monolithic carrier from the lower end until the amount of coating reached 50 g/$dm^3$ after the baking. Thus, the HC adsorbent layer 20 was formed.

<Upper Catalyst Layer 331>

Cerium oxide powder (Ce 67 mol %) containing 1 mol % of La and 32 mol % of Zr was impregnated with a palladium nitrate aqueous solution, or sprayed therewith while the cerium oxide powder was stirred at a high speed. After the cerium oxide powder was dried at 150° C. for 24 hours, the dried cerium oxide powder was baked at 400° C. for an hour, and then at 600° C. for an hour, and thus Pd-supported cerium oxide powder (powder-b) was obtained. The Pd concentration of this "powder-b" was 1.0%.

628 g of the foregoing Pd-supported cerium oxide powder (powder-b), 390 g of nitric acid alumina sol (39 g, in $Al_2O_3$, of sol obtained by adding 10% of nitric acid to 10% of boehmite alumina) and 2000 g of pure water were poured into a magnetic ball mill, then were mixed and milled, and thus a slurry solution was obtained. This slurry solution was coated on three-fourth portion of the foregoing HC adsorbent layer 20, which corresponds to the upstream side, dried after removing extra slurry in the cells by an air flow, and baked at 400° C. for an hour. The weight of the coating layer after the baking was 66.7 g/$dm^3$. Thus, the upper catalyst layer 331 was obtained.

<Lower Catalyst Layer 341>

Alumina powder (Al 97 mol %) containing 3 mol % of Ce was impregnated with a palladium nitrate aqueous solution, or sprayed therewith while the alumina powder was stirred at a high speed. After the alumina powder was dried at 150° C. for 24 hours, the dried alumina powder was baked at 400° C. for an hour, and then at 600° C. for an hour, and thus Pd supported alumina powder (powder-a) was obtained. The Pd concentration of this "powder-a" was 8.0%.

275 g of the foregoing Pd-supported alumina powder (powder-a), 240 g of nitric acid alumina sol (24 g, in $Al_2O_3$, of sol obtained by adding 10% of nitric acid to 10% of boehmite alumina), 50 g of barium carbonate (34 g of BaO) and 2000 g of pure water were poured into a magnetic ball mill, then were mixed and milled, and thus a slurry solution was obtained. This slurry solution was coated on the one-fourth portion in the downstream region of the HC adsorbent layer 20, dried after removing extra slurry in the cells by an air flow, and baked at 400° C. for an hour. The weight of the coating layer after the baking was 33.3 g/$dm^3$. Thus, the lower catalyst layer 341 was obtained.

Example II-2

FIG. 8 shows the structure of the HC-trap catalyst of the example II-2. In the HC-trap catalyst of the example II-2, the thick heat-resistant inorganic oxide layer 22 was formed in the downstream region, and thus the cross-sectional area of the exhaust gas passage was narrowed in the downstream region. Note that γ-alumina was used as the heat-resistant inorganic material. The upper catalyst layer 331 mainly contains Pd-supported Ce-[A]-Ob. Concretely, $La_{0.01}Ce_{0.69}Pr_{0.3}Ob$ was used as Ce-[A]-Ob. The lower catalyst layer 341 mainly contains Pt-supported Ce—$Al_2O_3$.

The HC adsorbent layer 20 and the heat-resistant inorganic oxide layer 22 were prepared by the following methods.

The upper catalyst layer 331 and the lower catalyst layer 341 were prepared under the similar conditions to those of the example II-1. However, instead of Zr, Pr was contained in the cerium oxide powder when preparing the upper catalyst layer 331.

<HC Adsorbent Layer 20>

800 g of β-zeolite powder (Si/2Al=35), 1333.3 g of silica sol (solid part 15 wt %) and 1000 g of pure water were poured into a ball mill pot made of alumina, then were milled for 60 minutes, and thus a slurry solution was obtained. This slurry solution was coated on a monolithic carrier of 300 cells/6 mills (46.5 cells/$cm^2$, wall thickness 0.0152 cm) and of a catalyst capacity 1.0 L, dried for 30 minutes in an air flow of 50° C. after removing extra slurry in the cells by an air flow, then baked at 400° C. for an hour after drying for 15 minutes in an air flow of 50° C. The coating step was repeated on a three-fourth portion located on the upstream side of the exhaust gas until the amount of coating reached 263 g/$dm^3$ after the baking. Thus, the HC adsorbent layer 20 was obtained.

<Heat-Resistant Inorganic Oxide Layer 22>

950 g of γ-alumina, 500 g of nitric acid alumina sol and 1000 g of pure water were poured into a magnetic ball mill, then were mixed and milled, and thus a slurry solution was obtained. The average particle diameter in this case was 1.0 to 1.5 μm. This slurry solution was coated on a one-fourth portion on the exhaust gas downstream side of the foregoing HC adsorbent layer 20, and dried after removing extra slurry in the cells by an air flow, then baked at 400° C. for an hour.

The weight of the coating layer after the baking was 90 g/$dm^3$. Thus, the heat-resistant inorganic oxide layer 22 was obtained.

Example II-3

Figure 9:
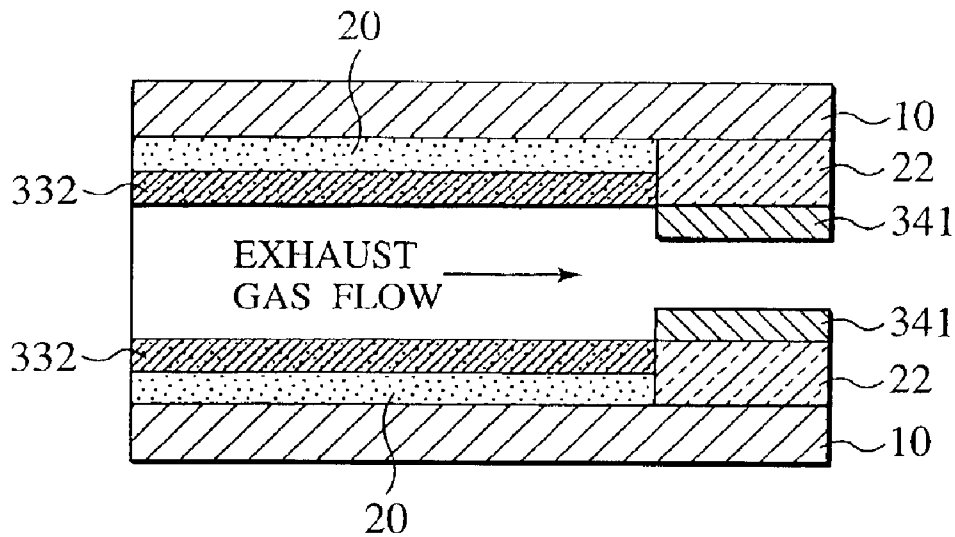

FIG. 9 shows the structure of the HC-trap catalyst of the example II-3. In the HC-trap catalyst of the example II-3, the thick heat-resistant inorganic oxide layer 22 was formed in the downstream region, and thus the cross-sectional area of the exhaust gas passage was narrowed in the downstream region. The HC adsorbent layer 20 and the heat-resistant inorganic oxide layer 22 were prepared under the same conditions as those of the example II-2.

The upper catalyst layer 332 mainly contains Pd-supported Ce-[A]-Ob and Pd-supported Ce—$Al_2O_3$. Concretely, $La_{0.01}Ce_{0.69}Nd_{0.3}Ob$ was used as Ce-[A]-Ob. The lower catalyst layer 341 contains Pd-supported Ce—$Al_2O_3$.

The lower catalyst layer 341 was prepared under the same conditions as those of the example II-2. The upper catalyst layer 332 was prepared under the following conditions.

<Upper Catalyst Layer 332>

Alumina powder (Al 97 mol %) containing 3 mol % of Ce was impregnated with a palladium nitrate aqueous solution, or sprayed therewith while the alumina powder was stirred at a high speed. After the alumina powder was dried at 150° C. for 24 hours, the dried alumina powder was baked at 400° C. for an hour, and then at 600° C. for an hour, and thus Pd-supported alumina powder (powder-c) was obtained. The Pd concentration of this "powder-c" was 1.0%.

Cerium oxide powder (Ce 69 mol %) containing 1 mol % of La and 30 mol % of Nd was impregnated with a palladium nitrate aqueous solution, or sprayed therewith while the cerium oxide powder was stirred at a high speed. After the cerium oxide powder was dried at 150° C. for 24 hours, the dried cerium oxide powder was baked at 400° C. for an hour, and then at 600° C. for an hour, and thus Pd-supported cerium oxide powder (powder-d) was obtained. The Pd concentration of this "powder-d" was 1.0%.

400 g of the foregoing Pd-supported alumina powder (powder-c), 228 g of the foregoing Pd-supported cerium oxide powder (powde-d), 140 g of nitric acid alumina sol (14 g, in $Al_2O_3$, of sol obtained by adding 10% of nitric acid to 10% of boehmite alumina), 25 g of barium carbonate (17 g of BaO) and 1000 g of pure water were poured into a magnetic ball mill, then were mixed and milled, and thus a slurry solution was obtained. This slurry solution was coated on the HC adsorbent layer 20 formed in advance, dried after removing extra slurry in the cells by an air flow, and baked at 400° C. for an hour. The weight of the coating layer after the baking was 66.7 g/$dm^3$. Thus, the upper catalyst layer 332 was obtained.

Example II-4

Figure 10:
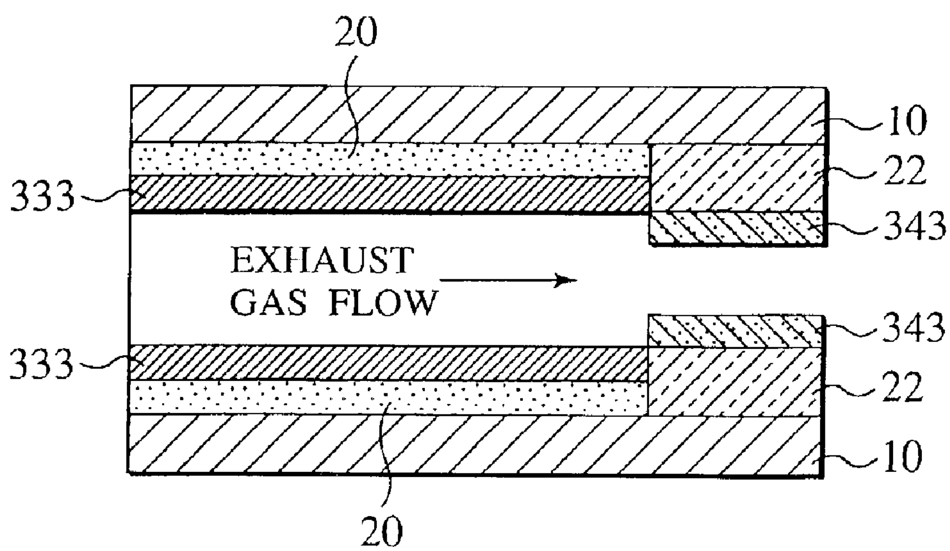

FIG. 10 shows the structure of the HC-trap catalyst of the example II-4. In the HC-trap catalyst of the example II-4, the thick heat-resistant inorganic oxide layer 22 was formed in the downstream region, and thus the cross-sectional area of the exhaust gas passage was narrowed in the downstream region. The HC adsorbent layer 20 and the heat-resistant inorganic oxide layer 22 were prepared under the same conditions as those of the example II-2.

The upper catalyst layer 333 mainly contains Pd-supported Ce-[A]-Ob. Concretely, $La_{0.01}Ce_{0.69}Pr_{0.2}Nd_{0.1}Ob$ was used as Ce-[A]-Ob. The lower catalyst layer 343 contains Pt-supported Ce—$Al_2O_3$, Rh-supported Zr—$Al_2O_3$, Pt-supported LaCe—$ZrO_2$. The upper catalyst layer 333 was prepared by a similar method of the example II-1. However, instead of Zr, Pr and Nd were contained in the cerium oxide powder when preparing the upper catalyst layer 333. Also the Pd concentration of the Pd-supported cerium oxide powder was 3.0%.

The lower catalyst layer 343 was prepared by the following preparation method.

<Lower Catalyst Layer 343>

Alumina powder (Al 97 mol %) containing 3 mol % of Zr was impregnated with a rhodium nitrate aqueous solution, or sprayed therewith while the alumina powder was stirred at a high speed. After the alumina powder was dried at 150° C. for 24 hours, the dried alumina powder was baked at 400° C. for an hour, and then at 600° C. for an hour, and thus Rh-supported alumina powder (powder-e) was obtained. The Rh concentration of this "powder-e" was 1.5%.

Alumina powder (Al 97 mol %) containing 3 mol % of Ce was impregnated with a dinitro diamine platinum aqueous solution, or sprayed therewith while the alumina powder was stirred at a high speed. After the alumina powder was dried at 150° C. for 24 hours, the dried alumina powder was baked at 400° C. for an hour, and then at 600° C. for an hour, and thus Pt supported alumina powder (powder-f) was obtained. The Pt concentration of this "powder f" was 1.5%.

Zirconium oxide powder containing 1 mol % of La and 20 mol % of Ce was impregnated with a dinitro diamine platinum aqueous solution, or sprayed therewith while the zirconium oxide powder was stirred at a high speed. After the zirconium oxide powder was dried at 150° C. for 24 hours, the dried zirconium oxide powder was baked at 400° C. for an hour, and then at 600° C. for an hour, and thus Pt supported zirconium oxide powder (powder-g) was obtained. The Pt concentration of this "powder-g" was 1.5%.

157 g of the foregoing Rh supported alumina powder (powder-e), 236 g of the foregoing Pt supported alumina powder (powder-f), 236 g of the foregoing Pt supported zirconium oxide powder (powder-g) and 380 g of nitric acid alumina sol were poured into a magnetic ball mill, then were mixed and milled, and thus a slurry solution was obtained. This slurry solution was coated on the heat-resistant inorganic oxide layer 22, dried after removing extra slurry in the cells by an air flow, and baked at 400° C. for an hour. The weight of the coating layer after the baking was 33.3 g/$dm^3$. Thus, the lower catalyst layer 343 was obtained.

Example II-5

Figure 11:
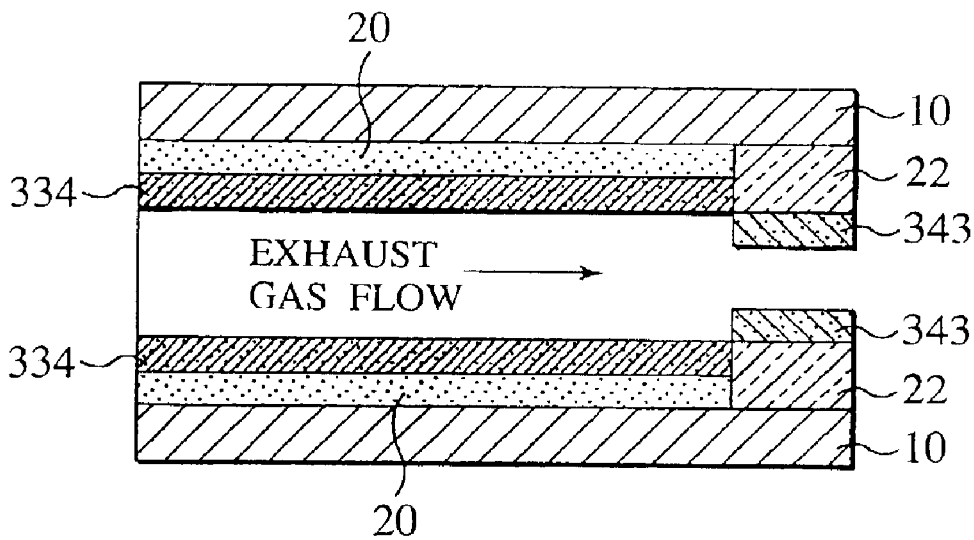

FIG. 11 shows the structure of the HC-trap catalyst of the example II-5. In the HC-trap catalyst of the example II-5, the thick heat-resistant inorganic oxide layer 22 was formed in the downstream region, and thus the cross-sectional area of the exhaust gas passage was narrowed in the downstream region. The HC adsorbent layer 20 and the heat-resistant inorganic oxide layer 22 were prepared under the same conditions as those of the example II-2.

The upper catalyst layer 334 mainly contains Pd-supported Ce-[A]-Ob and Pd-supported Ce—$Al_2O_3$. Concretely, $La_{0.01}Ce_{0.69}Zr_{0.2}Pr_{0.1}Ob$ was used as Ce-[A]-Ob. The lower catalyst layer 343 contains Pt-supported Ce—$Al_2O_3$, Rh-supported Zr—$Al_2O_3$, Pt-supported LaCe—ZrO2.

The upper catalyst layer 334 was prepared by a similar method of the example II-3. Note that, 400 g of Pd-supported alumina powder having 3.0% of Pd and 228 g of Pd-supported cerium oxide powder having 3% of Pd were used. The lower catalyst layer 343 was prepared under the same conditions as those of the example II-4.

Example II-6

FIG. 12 shows the structure of the HC-trap catalyst of the example II-6. In the HC-trap catalyst of the example II-6, the first honeycomb carrier 11 having the number of cells of 300 (46.5 cells/cm$^2$) was used in the upstream region, and the second honeycomb carrier 12 having the number of cells of 900 (139.5 cells/cm$^2$) was used in the downstream region, and thus the cross-sectional area of the exhaust gas passage was narrowed in the downstream region.

The HC adsorbent layer 20 was prepared on the first honeycomb carrier 11, and the upper catalyst layer 331 containing Pd-supported Ce-[A]-Ob was prepared on the HC adsorbent layer 20. Concretely, $La_{0.01}Ce_{0.69}Pr_{0.3}Ob$ was used as Ce-[A]-Ob. The lower catalyst layer 341 mainly containing Pd-supported Ce—$Al_2O_3$ was formed directly on the second honeycomb carrier 12. In the case of using the HC-trap catalyst of this example in the exhaust gas purifying system, the first honeycomb carrier 11 and the second honeycomb carrier 12 were arrayed in one catalyst converter so as to be adjacent to each other.

The preparation conditions of the respective layers will be described below.

<HC Adsorbent Layer 20>

800 g of β-zeolite powder (Si/2Al=35), 1333.3 g of silica sol (solid part 15 wt %) and 1000 g of pure water were poured into a ball mill pot made of alumina, then were milled for 60 minutes, and thus a slurry solution was obtained. This slurry solution was coated on the first monolithic carrier 11 of 300 cells/6 mills (46.5 cells/cm$^2$, wall thickness 0.0152 cm) and of a catalyst capacity 1.0 dm$^3$ (L). Then, the slurry solution was dried for 30 minutes in an air flow of 50° C. after removing extra slurry in the cells by an air flow, then baked at 400° C. for an hour after drying for 15 minutes in an air flow of 150° C. The coating step was repeated until the amount of coating reached 350 g/dm$^3$ after the baking. Thus, the HC adsorbent layer 20 was obtained.

<Upper Catalyst Layer 331>

Cerium oxide powder (Ce 67 mol %) containing 1 mol % of La and 32 mol % of Zr was impregnated with a palladium nitrate aqueous solution, or sprayed therewith while the cerium oxide powder was stirred at a high speed. After the cerium oxide powder was dried at 150° C. for 24 hours, the dried cerium oxide powder was baked at 400° C. for an hour, and then at 600° C. for an hour, and thus Pd-supported cerium oxide powder (powder-b) was obtained. The Pd concentration of this "powder-b" was 1.0%.

628 g of the foregoing Pd-supported cerium oxide powder (powder-b), 390 g of nitric acid alumina sol (39 g, in $Al_2O_3$, of sol obtained by adding 10% of nitric acid to 10% of boehmite alumina) and 2000 g of pure water were poured into a magnetic ball mill, then were mixed and milled, and thus a slurry solution was obtained. This slurry solution was coated on the HC adsorbent layer 20 formed on the first honeycomb carrier 11, dried after removing extra slurry in the cells by an air flow, and baked at 400° C. for an hour. The coating step was repeated until the amount of coating reached 66.7 g/dm$^3$ after the baking. Thus, the upper catalyst layer 331 was obtained.

<Lower Catalyst Layer 341>

Alumina powder (Al 97 mol %) containing 3 mol % of Ce was impregnated with a palladium nitrate aqueous solution, or sprayed therewith while the alumina powder was stirred at a high speed. After the alumina powder was dried at 150° C. for 24 hours, the dried alumina powder was baked at 400° C. for an hour, and then at 600° C. for an hour, and thus Pd-supported alumina powder (powder-a) was obtained. The Pd concentration of this "powder-a" was 8.0%.

275 g of the foregoing Pd-supported alumina powder (powder-a), 240 g of nitric acid alumina sol (24 g, in $Al_2O_3$, of sol obtained by adding 10% of nitric acid to 10% of boehmite alumina), 50 g of barium carbonate (34 g of BaO) and 2000 g of pure water were poured into a magnetic ball mill, then were mixed and milled, and thus a slurry solution was obtained. This slurry solution was coated on the second honeycomb carrier 12 of 900 cells/2 mills (139.5 cells/cm$^2$, wall thickness 0.005 cm) and of a catalyst capacity 0.25 dm$^3$(L), dried after removing extra slurry in the cells by an air flow, and baked at 400° C. for an hour. The weight of the coating layer after the baking was 33.3 g/dm$^3$. Thus, the lower catalyst layer 341 was obtained.

Example II-7

Figure 13:
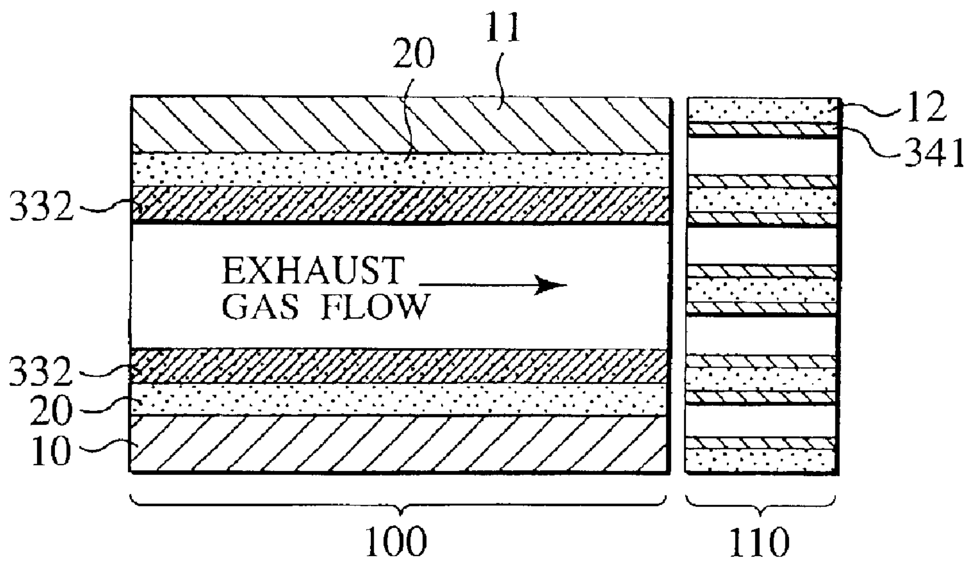

FIG. 13 shows the structure of the example II-7. The first honeycomb carrier 11 having the number of cells of 300 was used in the upstream region, and the second honeycomb carrier 12 having the number of cells of 900 was used in the downstream region. The HC-trap catalyst layer was prepared, which contained Pd-supported Ce-[A]-Ob and Pd-supported Ce—$Al_2O_3$ in the upper catalyst layer 332, and contained Pd-supported Ce—$Al_2O_3$ in the lower catalyst layer 341.

The HC adsorbent layer 20 and the upper catalyst layer 332 were prepared under the similar conditions to those of the example II-3. The lower catalyst layer 341 was prepared under the same conditions as those of the example II-6. Note that $La_{0.01}Ce_{0.69}Nd_{0.3}Ob$ was used as Ce-[A]-Ob.

Example II-8

Figure 14:
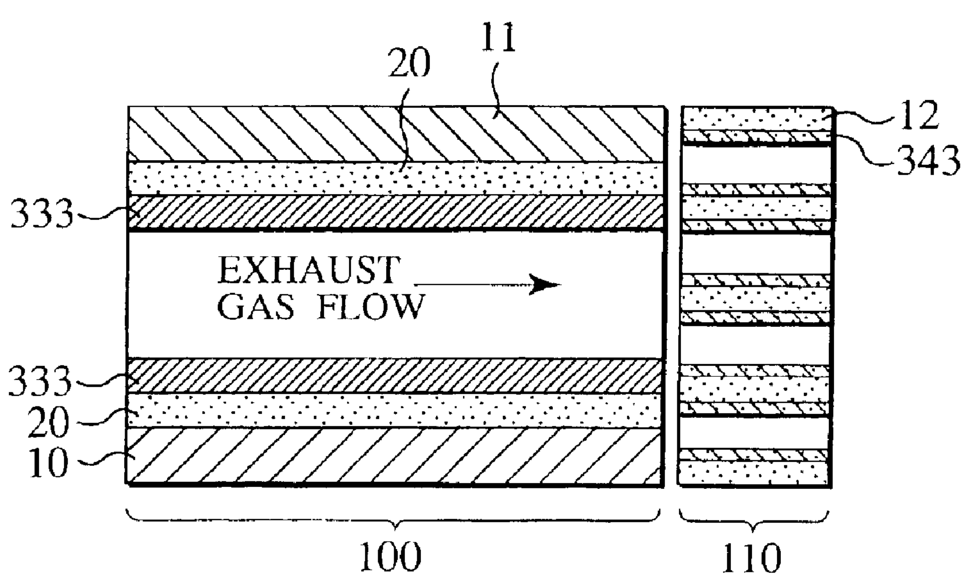

FIG. 14 shows the structure of the example II-8. The first honeycomb carrier 11 having the number of cells of 300 (46.5 cells/cm$^2$) was used in the upstream region, and the second honeycomb carrier 12 having the number of cells of 900 (139.5 cells/cm$^2$) was used in the downstream region. Pd-supported Ce-[A]-Ob is contained in the upper catalyst layer 331. Pd-supported Ce—$Al_2O_3$, Pt-supported Ce—$Al_2O_3$, Rh-supported Zr—$Al_2O_3$, Pt-supported LaCe—$ZrO_2$ are contained in the lower catalyst layer 343.

The HC adsorbent layer 20 and the upper catalyst layer 333 were prepared under the similar conditions to those of the example II-4. The lower catalyst layer 343 was prepared under the same conditions as those of the example II-4. Note that $La_{0.01}Ce_{0.69}Pr_{0.2}Nd_{0.1}Ob$ was used as Ce-[A]-Ob.

Example II-9

Figure 15:
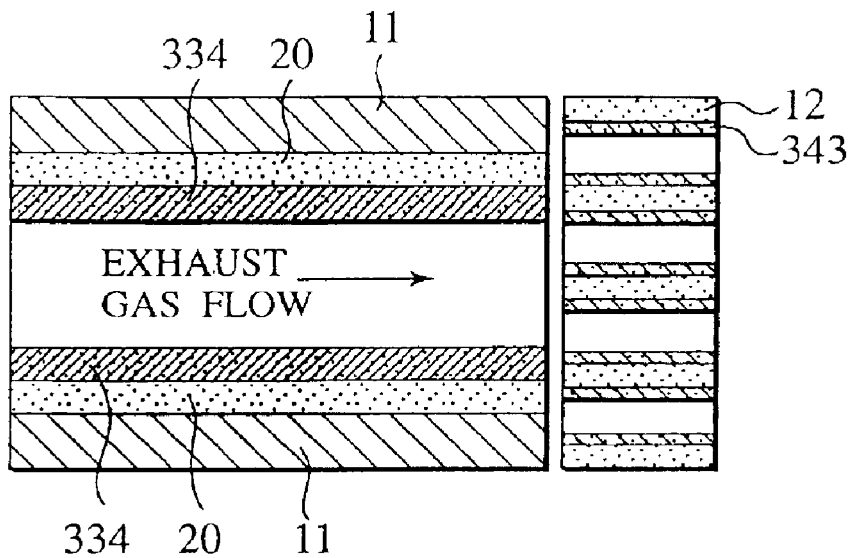

FIG. 15 shows the structure of the example II-9. Similarly to the example II-6, the first honeycomb carrier 11 having the number of cells of 300 was used in the upstream region, and the second honeycomb carrier 12 having the number of cells of 900 was used in the downstream region. Pd-supported Ce-[A]-Ob and Pd-supported Ce—$Al_2O_3$ are contained in the upper catalyst layer 334. Pd-supported Ce—$Al_2O_3$, Pt-supported Ce—$Al_2O_3$, Rh-supported Zr—$Al_2O_3$, Pt-supported LaCe—$ZrO_2$ are contained in the lower catalyst layer 343.

The HC adsorbent layer 20 and the upper catalyst layer 332 were prepared under the similar conditions as those of the example II-7. The lower catalyst layer 343 was prepared under the same conditions as those of the example II-8. Note that $La_{0.01}Ce_{0.69}Zr_{0.2}Pr_{0.1}Ob$ was used as Ce-[A]-Ob.

Example II-10

The HC-trap catalyst of the example II-10 has a same structure of the example II-1 shown in FIGS. 7A to 7C. The HC adsorbent layer in the downstream region was thickened, and thus the cross-sectional area of the exhaust gas passage in the downstream region was narrowed. The HC-trap catalyst of the example II-10 was prepared using a similar method of the example II-1. Note that $La_{0.01}Ce_{0.69}Y_{0.3}Ob$ was used as Ce-[A]-Ob in the upper catalyst layer.

Example II-11

The HC-trap catalyst of the example II-11 has a same structure of the example II-7 shown in FIG. 13. The HC-trap catalyst of the example II-11 was prepared using a similar method of the example II-7. Note that $La_{0.01}Ce_{0.69}Zr_{0.2}Y_{0.1}Ob$ was used as Ce-[A]-Ob in the upper catalyst layer.

Comparative Example II-1

Figure 16:
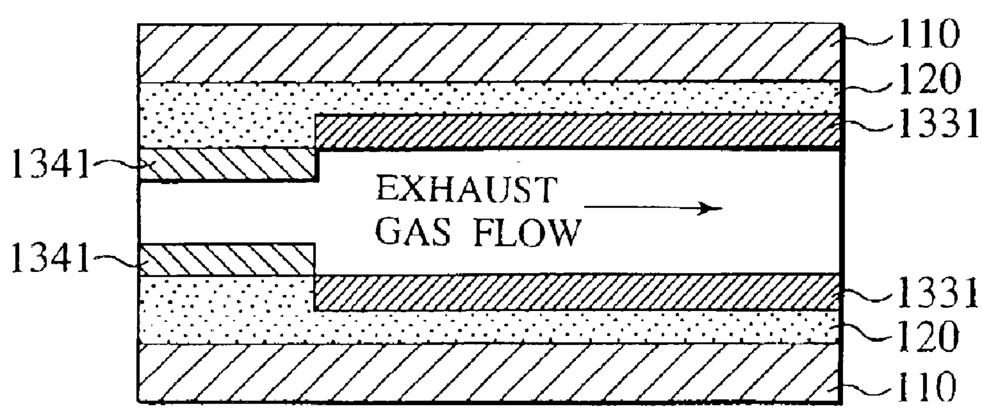
FIGS. 16 to 21 are enlarged cross-sectional views respectively showing cross sections parallel to exhaust gas flows in cells of exhaust gas purifying catalysts of comparative examples II-1 to II-5 related to the second embodiment.

FIG. 16 shows the structure of the comparative example II-1. The comparative example II-1 has the structure in which the upstream region and the downstream region of the structure of the example II-1 are inverted. Specifically, the HC adsorbent layer 120 of the upstream region was thickened, and thus the cross-sectional area of the upstream passage was narrowed. Moreover, the upper catalyst layer 1341 was composed similarly to the lower catalyst layer 341 of the example II-1, and the lower catalyst layer 1331 was composed similarly to the upper catalyst layer 331 of the example II-2. Fore other preparation conditions, similar ones to those of the example II-1 were used.

Comparative Example II-2

Figure 17:
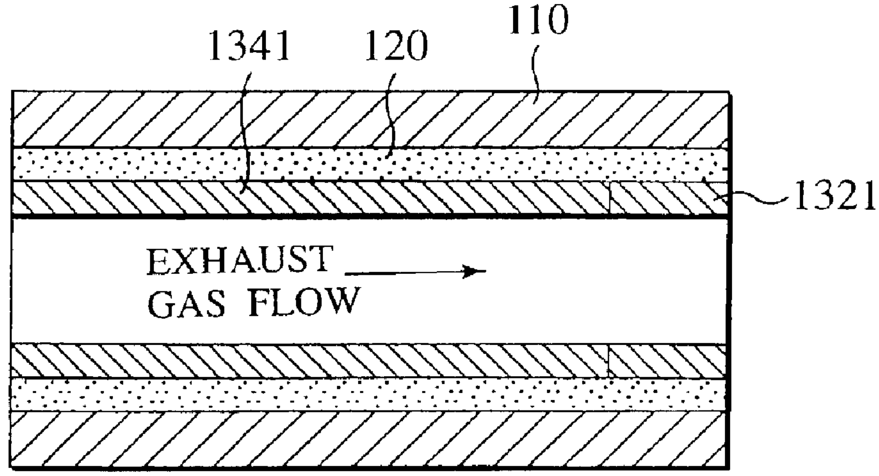

FIG. 17 shows the structure of the comparative example II-2. The comparative example II-2 is constituted such that the thickness of the HC adsorbent layer 120 is made even from the upstream to the downstream in the structure of the example II-1. For other conditions, similar ones to those of the example II-1 were used.

Comparative Example II-3

Figure 18:
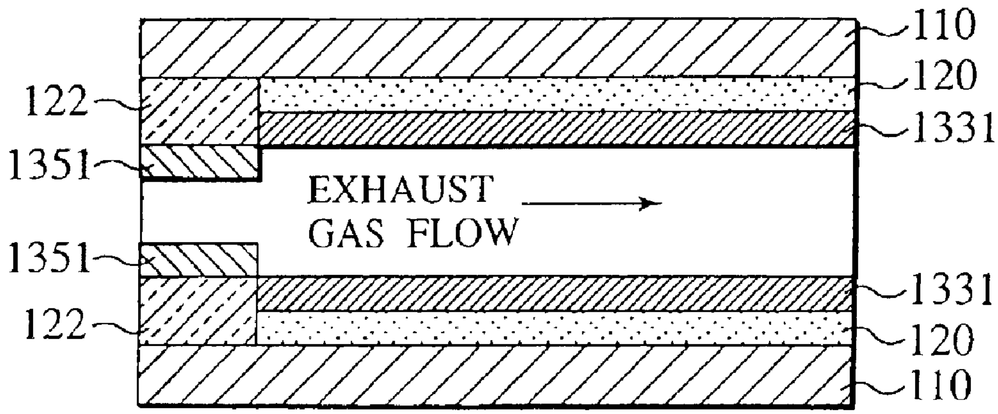

FIG. 18 shows the structure of the comparative example II-3. The comparative example II-3 has the structure in which the upstream region and the downstream region of the structure of the example II-2 are inverted. Specifically, the thick heat-resistant inorganic oxide layer 122 was formed in the upstream region, and thus the cross-sectional area of the upstream passage was narrowed. Moreover, the upper catalyst layer 1351 was composed similarly to the lower catalyst layer 341 of the example II-2, and the lower catalyst layer 1331 was composed similarly to the upper catalyst layer 331 of the example II-2. Fore other preparation conditions, similar ones to those of the example II-2 were used.

Comparative Example II-4

Figure 19:
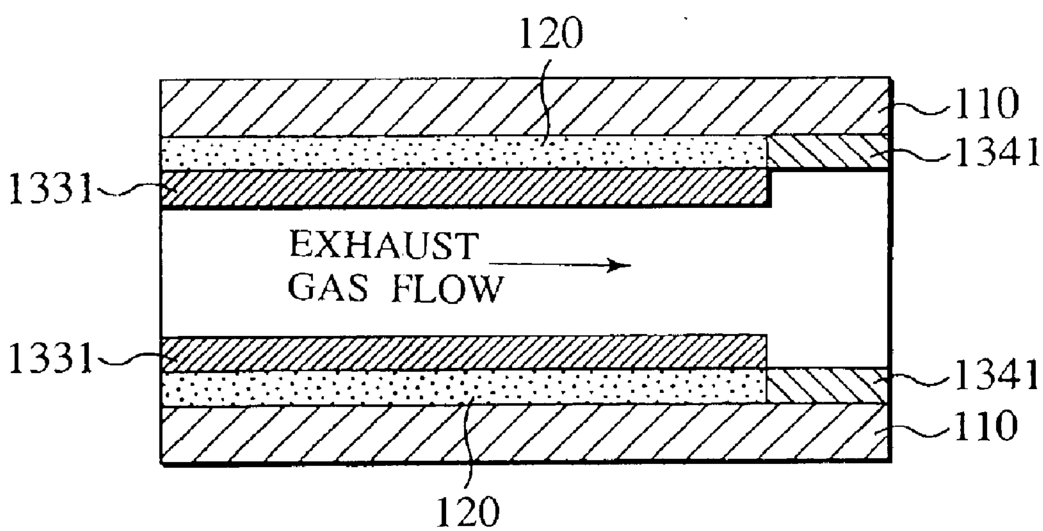

FIG. 19 shows the structure of the comparative example II-4. In the structure of the example II-2, no heat-resistant inorganic oxide layer was provided in the downstream region, and the lower catalyst layer 1341 was formed directly on the honeycomb carrier 110. Other than this, the similar conditions to those of the example II-2 were used for preparation.

Comparative Example II-5

Figure 20:
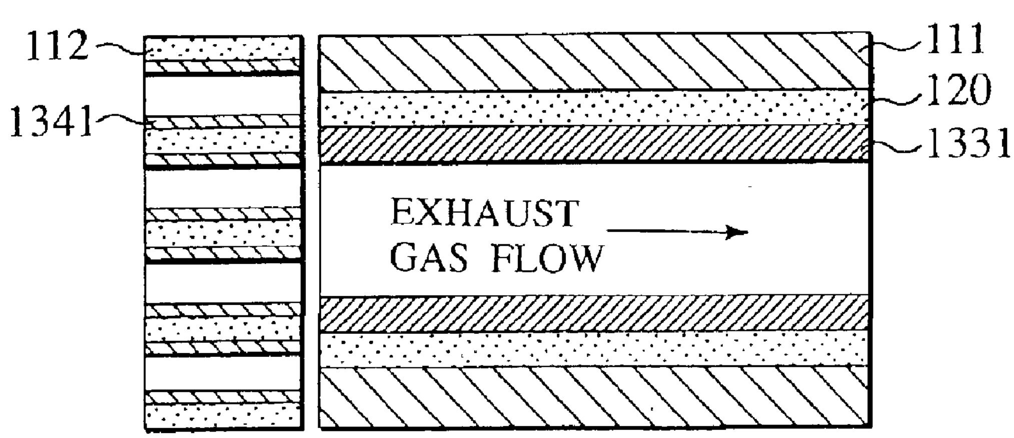

FIG. 20 shows the structure of the comparative example II-5. The comparative example II-5 has the structure in which the upstream region and the downstream region of the example II-6 are inverted. Specifically, the second honeycomb carrier 112 having a large number of cells was located in the upstream region, and the first honeycomb carrier 111 having a small number of cells was located in the downstream region. For other conditions, the same ones as those of the example II-6 were used.

Comparative Example II-6

Figure 21:
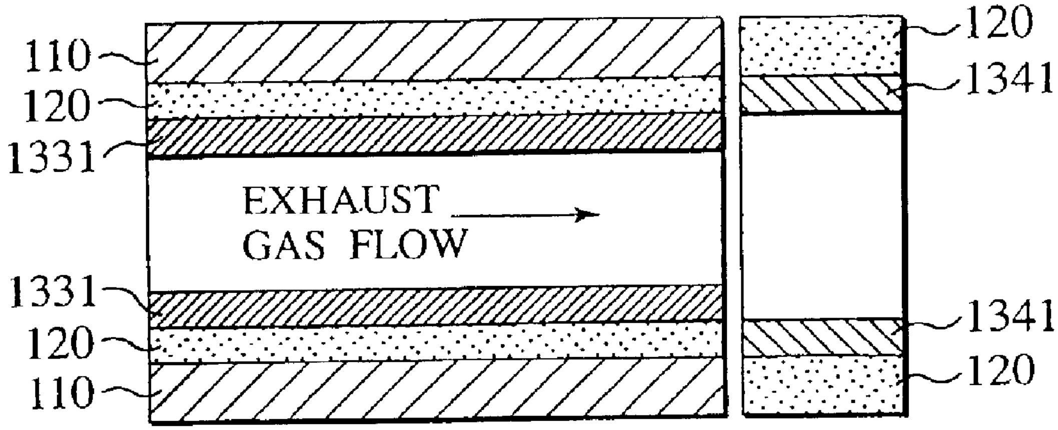

FIG. 21 shows the structure of the comparative example II-6. The comparative example II-6 was constituted such that the second honeycomb carrier constructed as in the example II-6 was replaced with the carrier 130 having the same number of cells as that of the first honeycomb carrier 110, that is, the carrier 130 of 300 cells/6 mills (46.5 cells/$cm^2$, wall thickness 0.0152 cm).

<Method of Evaluation>

Each of the catalysts of the examples II-1 to II-11 and the comparative examples II-1 to II-6 was used as the HC-trap catalyst 100 of the exhaust gas purifying system shown in FIG. 5, and the HC adsorption rate and the HC purification efficiency were measured. The same evaluation conditions as in the first embodiment were used. The same three-way catalyst as the three-way catalyst 200 in the first embodiment was used. The results were shown in the table of FIG. 22D.

It was found out that the HC-trap catalysts obtained in the examples II-1 to II-11 were superior in HC adsorbing/purifying capability to the catalysts obtained in the comparative examples II-1 to II-6.

The entire contents of Japanese Patent Applications P2001-336188 (filed on Nov. 1, 2001), P2001-336227 (filed on Nov. 1, 2001) and P2002-294435 (filed on Oct. 8, 2002) are incorporated herein by reference. Although the inventions have been described above by reference to certain embodiments of the inventions, the inventions are not limited to the embodiments described above. Modifications and variations of the embodiments described above will occur to those skilled in the art, in light of the above teachings. The scope of the inventions is defined with reference to the following claims.

What is claimed is:

1. An exhaust gas purifying catalyst, comprising:

a carrier having a plurality of cells as exhaust gas passages along an exhaust gas flow direction;

an HC adsorbent layer formed on the carrier of each of the cells;

an upper catalyst layer disposed on an upstream side of each of the exhaust gas passages on the HC adsorbent layer; and a lower catalyst layer disposed on a downstream side of each of the exhaust gas passages on the HC adsorbent layer, wherein the upper catalyst layer is located upstream of the lower catalyst layer in the exhaust gas passages along the exhaust gas flow direction and contains more amount of an $O_2$-storage material than the lower catalyst layer, and the lower catalyst layer includes a catalyst having a wider activation range than the upper catalyst layer.

2. The exhaust gas purifying catalyst according to claim 1, wherein the upper catalyst layer includes Pd-supported Ce-[A]-Ob, the Ce-[A]-Ob is an oxide compound of cerium and A, and the A is at least one element selected from the group consisting of zirconium, lanthanum, yttria, praseodymium and neodymium.

3. The exhaust gas purifying catalyst according to claim 2, wherein the upper catalyst layer further includes Pd-supported Ce—$Al_2O_3$.

4. The exhaust gas purifying catalyst according to claim 2, wherein the lower catalyst layer includes, as a main component, at least one selected from the group consisting of Ce—$Al_2O_3$, Pt-supported Ce—$Al_2O_3$, Rh-supported Ce—$Al_2O_3$ and Zr-contained $CeO_2$.

5. The exhaust gas purifying catalyst according to claim 1, wherein the carrier is a monolithic structure, and the upper catalyst layer is provided in a range from 50 to 90% of an overall length of the cell in an upstream region.

6. An exhaust gas purifying catalyst, comprising:

a carrier having a plurality of cells as exhaust gas passages along an exhaust gas flow direction;

an HC adsorbent layer formed at least on an upstream region on the carrier of each of the cells; and a purifying catalyst layer formed on the HC adsorbent layer, wherein the purifying catalyst layer includes an upper catalyst layer disposed on an upstream side of each of the exhaust gas passages and a lower catalyst layer disposed on a downstream side of each of the exhaust gas passages, the upper catalyst layer is located upstream of the lower catalyst layer in the exhaust gas passages along the exhaust gas flow direction and contains more amount of an $O_2$-storage material than the lower catalyst layer, the lower catalyst layer includes a catalyst having a wider activation range than the upper catalyst layer, and a cross-sectional area of the exhaust gas passages is narrower on the downstream side than on the upstream side.

7. The exhaust gas purifying catalyst according to claim 6, wherein an average passage cross-sectional area $A_1$ of a region where the upper catalyst layer is formed and an average passage cross-sectional area $A_2$ of a region where the lower catalyst layer is formed satisfy a relationship of:

$$A_1:A_2=1:0.99 \text{ to } 0.6.$$

8. The exhaust gas purifying catalyst according to claim 6, wherein the HC adsorbent layer covers an entire region of the carrier of each of the cells, and the HC adsorbent layer formed in a downstream region of the exhaust gas passage is thicker than the HC adsorbent layer formed in the upstream region thereof.

9. The exhaust gas purifying catalyst according to claim 6, further comprising:

a heat-resistant inorganic oxide layer formed in the downstream region on the carrier of each of the cells, wherein the HC adsorbent layer is formed in the upstream region on the carrier, and the heat-resistant inorganic oxide layer is thicker than the HC adsorbent layer.

10. The exhaust gas purifying catalyst according to claim 9, wherein the heat-resistant inorganic oxide layer includes γ-alumina having a particle diameter of 1 to 3 μm as a main component.

11. The exhaust gas purifying catalyst according to claim 9, wherein the upper catalyst layer includes Ce-[A]-Ob as a main component, the Ce-[A]-Ob is an oxide compound of cerium and A, and the A is at least one element selected from the group consisting of zirconium, lanthanum, yttria, praseodymium and neodymium.

12. The exhaust gas purifying catalyst according to claim 11, wherein the upper catalyst layer further includes Pd-supported Ce—$Al_2O_3$.

13. The exhaust gas purifying catalyst according to claim 11, wherein the lower catalyst layer includes, as a main component, at least one selected from the group consisting of Pd-supported Ce—$Al_2O_3$, Pt-supported Ce—$Al_2O_3$, Rh-supported Ce—$Al_2O_3$ and Zr-contained $CeO_2$.

14. The exhaust gas purifying catalyst according to claim 9, wherein the carrier is a monolithic structure, and the upper catalyst layer is provided in a range from 50 to 90% of an overall length of the cell in the upstream region.

15. The exhaust gas purifying catalyst according to claim 6, wherein the carrier includes:

a first carrier disposed on the upstream side; and a second carrier disposed on the downstream side, the second carrier having a larger number of cells than the first carrier.

16. The exhaust gas purifying catalyst according to claim 15, wherein the number of cells of the second carrier is twice to five times the number of cells of the first carrier.

17. The exhaust gas purifying catalyst according to claim 15, wherein in each cell of the first carrier, an HC adsorbent layer is formed on the first carrier and the upper catalyst layer is formed on the HC adsorbent layer, and in each cell of the second carrier, the lower catalyst layer is formed on the second carrier.

18. The exhaust gas purifying catalyst according to claim 17, wherein the upper catalyst layer includes Ce-[A]-Ob as a main component, the Ce-[A]-Ob is an oxide compound of cerium and A, and the A is at least one element selected from the group consisting of zirconium, lanthanum, yttria, praseodymium and neodymium.

19. The exhaust gas purifying catalyst according to claim 18, wherein the upper catalyst layer further includes Pd-supported Ce—$Al_2O_3$.

20. The exhaust gas purifying catalyst according to claim 19, wherein the lower catalyst layer includes, as a main component, at least one selected from the group consisting of Pd-supported Ce—$Al_2O_3$, Pt-supported Ce—$Al_2O_3$, Rh-supported Ce—$Al_2O_3$ and Zr-contained $CeO_2$.

* * * * *